(12) United States Patent
Baek et al.

(10) Patent No.: US 11,900,717 B2
(45) Date of Patent: Feb. 13, 2024

(54) FOLDABLE ELECTRONIC DEVICE FOR DETECTING FINGERPRINTS THROUGH AT LEAST A PART OF DISPLAY

(71) Applicant: Samsung Electronics Co., Ltd., Suwon-si (KR)

(72) Inventors: Seunggeol Baek, Suwon-si (KR); Jinho Kim, Suwon-si (KR); Bongjae Rhee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/964,455

(22) Filed: Oct. 12, 2022

(65) Prior Publication Data

US 2023/0072841 A1 Mar. 9, 2023

Related U.S. Application Data

(63) Continuation of application No. PCT/KR2022/013349, filed on Sep. 6, 2022.

(30) Foreign Application Priority Data

Sep. 7, 2021 (KR) .................. 10-2021-0119250

(51) Int. Cl.
*G06V 40/13* (2022.01)
*H04M 1/02* (2006.01)
*G06V 40/12* (2022.01)

(52) U.S. Cl.
CPC ...... *G06V 40/1318* (2022.01); *G06V 40/1365* (2022.01); *H04M 1/0216* (2013.01); *H04M 1/0268* (2013.01)

(58) Field of Classification Search
None
See application file for complete search history.

(56) References Cited

U.S. PATENT DOCUMENTS

| 10,542,128 B2 | 1/2020 | Kang et al. |
| 11,410,456 B2 | 8/2022 | Lee et al. |

(Continued)

FOREIGN PATENT DOCUMENTS

| KR | 10-2017-0006055 A | 1/2017 |
| KR | 10-2021-0092365 A | 7/2021 |

(Continued)

OTHER PUBLICATIONS

International Search Report dated Dec. 15, 2022, issued in International Patent Application No. PCT/KR2022/013349.

*Primary Examiner* — Joseph R Haley
(74) *Attorney, Agent, or Firm* — Jefferson IP Law, LLP

(57) ABSTRACT

An electronic device is provided. The electronic device includes a housing structure including a hinge, a first housing connected to the hinge and including a first surface and a second surface directed in the opposite direction of the first surface, and a second housing connected to the hinge and including a third surface and a fourth surface directed in the opposite direction of the third surface, and configured such that the first surface faces the third surface in a folded state and such that the first surface and the third surface are directed in the same direction in an unfolded state, a first display disposed over the first surface and the third surface, a second display exposed to the outside through at least a portion of the fourth surface, and a fingerprint recognition module including a first fingerprint contact portion formed in at least a portion of the first display corresponding to the third surface and transmitting a first light into the second housing, a second fingerprint contact portion formed in at least a portion of the second display and transmitting a second light into the second housing, a first reflective member configured to reflect the first light, a second reflective member configured to reflect the second light, and an image sensor configured to detect the first light or the second (Continued)

light, wherein the first reflective member is disposed to reflect the first light such that the reflected first light forms a first path from the first reflective member toward the image sensor, and wherein the second reflective member is disposed to reflect the second light such that the reflected second light forms a second path from the second reflective member toward the image sensor.

18 Claims, 14 Drawing Sheets

(56) References Cited

U.S. PATENT DOCUMENTS

| | | |
|---|---|---|
| 2010/0123655 A1 | 5/2010 | Lai |
| 2017/0161543 A1 | 6/2017 | Smith et al. |
| 2018/0276672 A1 | 9/2018 | Breed et al. |
| 2021/0326560 A1 | 10/2021 | Ye |
| 2021/0406509 A1* | 12/2021 | Cheng ............... G06V 40/1324 |
| 2022/0357910 A1* | 11/2022 | Kumar Agrawal ........................ G06F 3/04886 |

FOREIGN PATENT DOCUMENTS

| | | |
|---|---|---|
| KR | 10-2021-0106567 A | 8/2021 |
| WO | 2020/135182 A1 | 7/2020 |

* cited by examiner (a)

(b)

(a)

(b)

FOLDABLE ELECTRONIC DEVICE FOR DETECTING FINGERPRINTS THROUGH AT LEAST A PART OF DISPLAY

CROSS-REFERENCE TO RELATED APPLICATION(S)

This application is a continuation application, claiming priority under § 365(c), of an International application No. PCT/KR2022/013349, filed on Sep. 6, 2022, which is based on and claims the benefit of a Korean patent application number 10-2021-0119250, filed on Sep. 7, 2021, in the Korean Intellectual Property Office, the disclosure of which is incorporated by reference herein in its entirety.

TECHNICAL FIELD

The disclosure relates to an electronic device. More particularly, the disclosure relates to a foldable electronic device including a flexible display and detecting fingerprints through at least a portion of the display.

BACKGROUND ART

Electronic devices are being transformed from a uniform rectangular shape into a variety of shapes. For example, electronic devices may have a deformable structure that is convenient to carry and enables a use of a large-screen display when used. As a part of such electronic devices, a foldable electronic device has been released.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Recently, a technology for detecting a fingerprint through at least a portion of a display has been applied to electronic devices. A display of the electronic device may include a window made of a relatively rigid glass material, and a fingerprint sensor may be disposed to overlap at least a portion of the display.

The foldable electronic device may drive a flexible display in an unfolded state and include an auxiliary display disposed to face in a direction opposite the flexible display in order to operate in a folded state. In order to place fingerprint sensors both for the flexible display and for the auxiliary display, a plurality of fingerprint recognition modules directed in different directions may have to be disposed in the same housing structure, which may cause a problem in a limited mounting space of the housing. In addition, placement of a plurality of the same modules may cause problems such as an increase in cost and an increase in the weight of an electronic device.

Aspects of the disclosure are to address at least the above-mentioned problems and/or disadvantages and to provide at least the advantages described below. Accordingly, an aspect of the disclosure is to provide a foldable electronic device including a flexible display and detecting fingerprints through at least a portion of the display.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a housing structure that includes a hinge, a first housing connected to the hinge and including a first surface and a second surface directed in the opposite direction of the first surface, and a second housing connected to the hinge and including a third surface and a fourth surface directed in the opposite direction of the third surface, and is configured such that the first surface faces the third surface in a folded state and such that the first surface and the third surface are directed in the same direction in an unfolded state, a first display disposed over the first surface and the third surface, a second display exposed to the outside through at least a portion of the fourth surface, and a fingerprint recognition module including a first fingerprint contact portion formed in at least a portion of the first display corresponding to the third surface and transmitting a first light into the second housing, a second fingerprint contact portion formed in at least a portion of the second display and transmitting a second light into the second housing, a first reflective member configured to reflect the first light, a second reflective member configured to reflect the second light, and an image sensor configured to detect the first light or the second light, wherein the first reflective member is disposed to reflect the first light such that the reflected first light forms a first path from the first reflective member toward the image sensor, and wherein the second reflective member is disposed to reflect the second light such that the reflected second light forms a second path from the second reflective member toward the image sensor.

In accordance with another aspect of the disclosure, a method for recognizing a fingerprint by an electronic device is provided. The method includes an image sensor, a first reflective member configured to reflect a first light to the image sensor, and a second reflective member configured to reflect a second light to the image sensor and including a dichroic material that transmits a light beam having a wavelength in a first range and reflects a light beam having a wavelength in a second range different from the first range may include recognizing a fingerprint, based on the first light detected through the image sensor, recognizing a fingerprint, based on light having a wavelength in the first range, among the second light detected through the image sensor, and calculating an intensity of an external light source, based on light having a wavelength in the second range, among the detected second light.

Advantageous Effects of Invention

According to various embodiments, fingerprint recognition may be performed through each of a flexible display and an auxiliary display.

According to various embodiments, the degree of freedom in selecting the position of a fingerprint contact portion may be increased using a first reflective member and a second reflective member, and the thickness of a housing may be reduced.

According to various embodiments, it is possible to secure a mounting space, reduce mounting weight, and reduce costs by enabling bidirectional fingerprint recognition using a single image sensor.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

Figure 1:
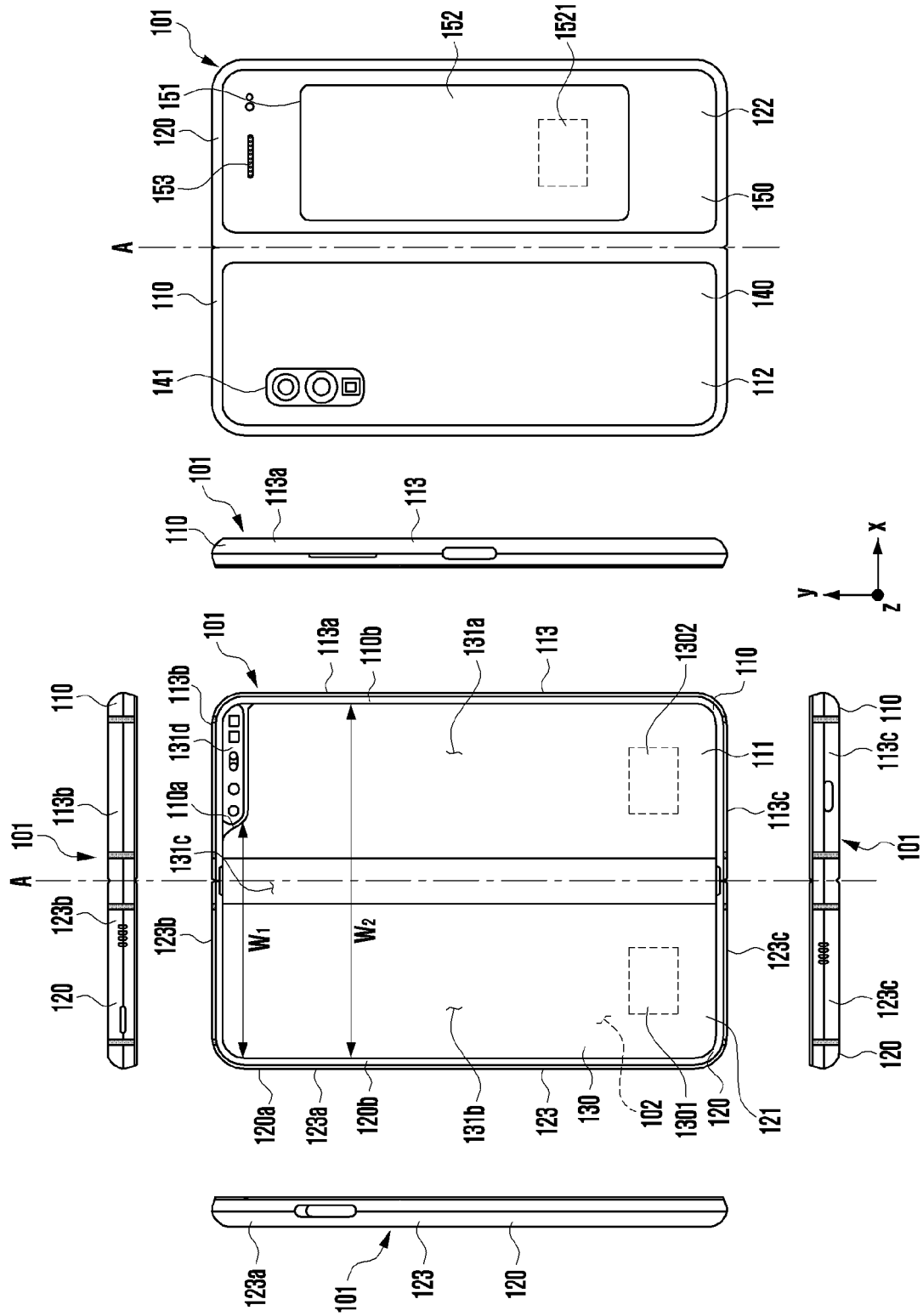
FIG. 1 is a diagram illustrating an unfolded state of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

With regard to the description of the drawings, similar reference numerals may be used to refer to similar or related elements.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 is a diagram illustrating an unfolded state of an electronic device 101 according to an embodiment of the disclosure.

Figure 2:
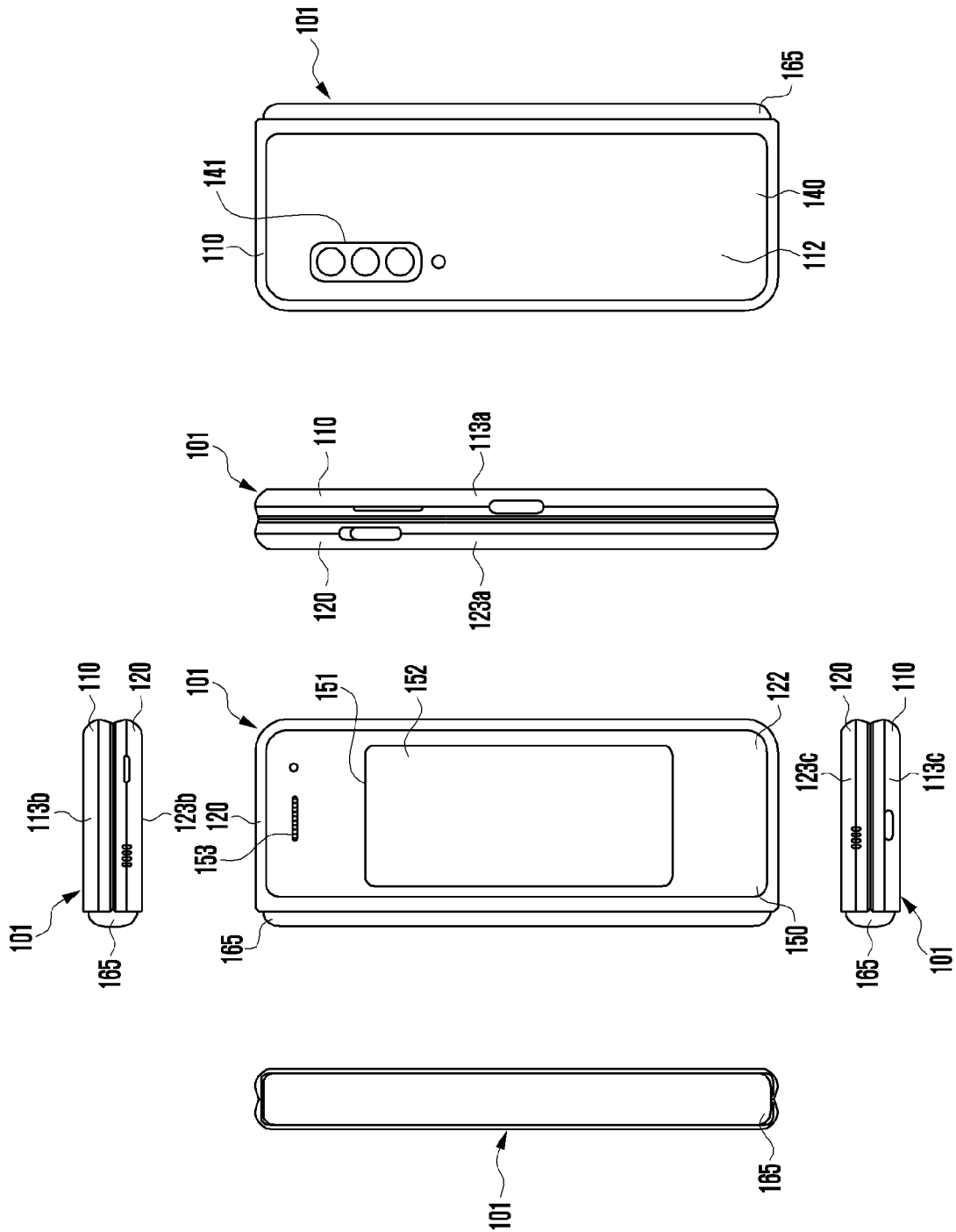
FIG. 2 is a diagram illustrating a folded state of the electronic device in FIG. 1 according to an embodiment of the disclosure.

FIG. 2 is a diagram illustrating a folded state of the electronic device in FIG. 1 according to an embodiment of the disclosure.

Referring to FIG. 1, an electronic device 101 may include a pair of housings 110 and 120 (e.g., a foldable housing) rotatably coupled through a hinge (e.g., the hinge 164 in FIG. 3) to be folded relative to each other, a hinge cover (e.g., the hinge cover 165 in FIG. 2) that covers foldable portions of the pair of housings 110 and 120, and a display 130 (e.g., a flexible display, a foldable display, or a first display) disposed in a space formed by the pair of housings 110 and 120. In this document, the surface on which the display 130 is disposed may be defined as a front surface of the electronic device 101, and the opposite surface of the front surface may be defined as a rear surface of the electronic device 101. In addition, the surface surrounding the space between the front surface and the rear surface may be defined as a side surface of the electronic device 101.

In an embodiment, the pair of housings 110 and 120 may include a first housing 110 including a sensor area 131d, a second housing 120, a first rear cover 140, and a second rear cover 150. The pair of housings 110 and 120 of the electronic device 101 is not limited to the form and coupling shown in FIGS. 1 and 2, and may be implemented by a combination and/or coupling of other shapes or components. For example, in another embodiment, the first housing 110 and the first rear cover 140 may be integrally formed, and the second housing 120 and the second rear cover 150 may be integrally formed.

According to yet another embodiment, the first housing 110 and the second housing 120 may be disposed on both sides of the folding axis (an axis A) and have a substantially symmetrical shape as a whole with respect to the folding axis (the axis A). According to yet another embodiment, the angle or distance between the first housing 110 and the second housing 120 may vary depending on whether the electronic device 101 is an unfolded state (or a flat state), a folded state, or an intermediate state. According to yet another embodiment, the first housing 110 further includes a sensor area 131d in which various sensors are disposed, unlike the second housing 120, but may have a symmetrical shape in other areas. In yet another embodiment, the sensor area 131d may be further provide in at least a partial area of the second housing 120 or may be replaced thereby. In yet another embodiment, the first housing 110 may include, in the unfolded state of the electronic device 101, a first surface 111 connected to a hinge (e.g., the hinge 164 in FIG. 3) and disposed to be directed to the front surface of the electronic device 101, a second surface 112 directed in the opposite direction of the first surface 111, and a first side member 113 surrounding at least a portion of the space between the first surface 111 and the second surface 112. In yet another embodiment, the first side member 113 may include a first side surface 113a disposed parallel to the folding axis (the axis A), a second side surface 113b extending from one end of the first side surface 113a in a direction perpendicular to the folding axis, and a third side surface 113c extending from the opposite end of the first side surface 113a in a direction perpendicular to the folding axis (the axis A).

In yet another embodiment, the second housing 120 may include, in the unfolded state of the electronic device 101, a third surface 121 connected to the hinge (e.g., the hinge 164 in FIG. 3) and disposed to directed to the front of the electronic device 101, a fourth surface 122 directed in the opposite direction of the third surface 121, and a second side member 123 surrounding at least a portion of the space between the third surface 121 and the fourth surface 122. In yet another embodiment, the second side member 123 may include a fourth side surface 123a disposed parallel to the folding axis (the axis A), a fifth side surface 123b extending from one end of the fourth side surface 123a in a direction perpendicular to the folding axis (the axis A), and a sixth side surface 123c extending from the opposite end of the fourth side surface 123a in a direction perpendicular to the folding axis (the axis A). In yet another embodiment, the third surface 121 may face the first surface 111 in the folded state.

In yet another embodiment, the electronic device 101 may include a recess 102 that is formed to receive the display 130 through structural coupling of the first housing 110 and the second housing 120. The recess 102 may have substantially the same size as the display 130. In yet another embodiment, the recess 102 may have two or more different widths in a direction perpendicular to the folding axis (the axis A) due to the sensor area 131d. For example, the recess 102 may have a first width W1 between a first portion 120a of the second housing 120, which is parallel to the folding axis (the axis A), and a second portion 110a of the first housing 110, which is formed at the edge of the sensor area 131d, and a second width W2 between a third portion 120b of the second housing 120 and a fourth portion 110b of the first housing 110, which does not belong to the sensor area 113d and is parallel to the folding axis (the axis A). In this case, the second width W2 may be formed to be greater than the first width W1. For example, the recess 102 may be formed to have a first width W1 formed between the second portion 110a of the first housing 110 and the first portion 120a of the second housing 120, which are asymmetric to each other, and a second width W2 formed between the fourth portion 110b of the first housing 110 and the third portion 120b of the second housing 120, which are symmetric to each other. In yet another embodiment, the second portion 110a and the fourth portion 110b of the first housing 110 may be formed to have different distances from the folding axis (the axis A). The width of the recess 102 is not limited to the illustrated example. In various embodiments, the recess 102 may have two or more different widths due to the shape of the sensor area 131d or asymmetric portions of the first housing 110 and the second housing 120.

In yet another embodiment, at least a portion of the first housing 110 and the second housing 120 may be formed of a metal material or a non-metal material having a selected rigidity to support the display 130.

In yet another embodiment, the sensor area 131d may be formed adjacent to one corner of the first housing 110 to have a predetermined area. However, the arrangement, shape, or size of the sensor area 131d is not limited to the illustrated example. For example, in another embodiment, the sensor area 131d may be provided in another corner of the first housing 110 or any area between the upper corner and the lower corner. In yet another embodiment, the sensor area 131d may be disposed in at least a partial area of the second housing 120. In another embodiment, the sensor area 131d may be disposed to extend to the first housing 110 and the second housing 120. In an embodiment, the electronic device 101 may include components that are disposed to be exposed to the front surface of the electronic device 101 through the sensor area 131d or through one or more openings provided in the sensor area 131d and perform various functions. In various embodiments, the components may include, for example, at least one of a camera device (e.g., the camera module 182 in FIG. 3), a receiver, a proximity sensor, an illuminance sensor, an iris recognition sensor, an ultrasonic sensor, or an indicator.

In yet an embodiment, the first rear cover 140 may be disposed on the second surface 112 of the first housing 110 and have a substantially rectangular periphery. In an embodiment, at least a portion of the periphery may be surrounded by the first housing 110. Similarly, the second rear cover 150 may be disposed on the fourth surface 122 of the second housing 120, and at least a portion of a periphery thereof may be covered by the second housing 120.

In the illustrated embodiment, the first rear cover 140 and the second rear cover 150 may have a substantially symmetric shape with respect to the folding axis (the axis A). In yet another embodiment, the first rear cover 140 and the second rear cover 150 may include a variety of different shapes. In another yet embodiment, the first rear cover 140 may be integrally formed with the first housing 110, and the second rear cover 150 may be integrally formed with the second housing 120.

In yet another embodiment, the first rear cover 140, the second rear cover 150, the first housing 110, and the second housing 120 may be coupled to each other, thereby providing a space in which various components (e.g., a printed circuit board, an antenna module, a sensor module, or a battery) of the electronic device 101 may be disposed. In yet another embodiment, one or more components may be disposed on the rear surface of the electronic device 101 or may be visually exposed therethrough. For example, one or more components or sensors may be visually exposed through the first rear area 141 of the first rear cover 140. In various embodiments, the sensor may include a proximity sensor, a camera device (e.g., the camera module 182 of FIG. 3) and/or a flash. In yet another embodiment, at least a portion of a second display 152 (e.g., the sub-display) may be visually exposed through the second rear area 151 of the second rear cover 150. In yet another embodiment, the electronic device 101 may include a speaker module 153 disposed in at least a partial area of the second rear cover 150.

The display 130 may be disposed in a space formed by the pair of housings 110 and 120. For example, the display 130 may be seated in a recess 102 formed by the pair of housings 110 and 120 and may be disposed to occupy substantially most of the front surface of the electronic device 101. Accordingly, the front surface of the electronic device 101 may include the display 130, and a partial area (e.g., an edge area) of the first housing 110 and a partial area (e.g., an edge area) of the second housing 120, which are adjacent to the display 130. In yet another embodiment, the rear surface of the electronic device 101 may include a first rear cover 140, a partial area (e.g., an edge area) of the first housing 110 adjacent to the first rear cover 140, a second rear cover 150, and a partial area (e.g., an edge area) of the second housing 120 adjacent to the second rear cover 150.

In yet another embodiment, the display 130 may include a display of which at least a partial area may be transformed into a flat surface or a curved surface. In yet another embodiment, the display 130 may include a folding area 131*c*, a first area 131*a* disposed on one side (e.g., the right area of the folding area 131*c*) of the folding area 131*c*, and a second area 131*b* disposed on the other side (e.g., the left area of the folding area 131*c*) thereof. For example, the first area 131*a* may be disposed on the first surface 111 of the first housing 110, and the second area 131*b* may be disposed on the third surface 121 of the second housing 120. In yet another embodiment, the division of areas in the display 130 is exemplary, and the display 130 may be divided into a plurality (e.g., four or more or two) areas depending on a structure or function. For example, although the display 130 may be divided into areas based on the folding area 131*c* extending parallel to the y-axis or the folding axis (the axis A) in the embodiment shown in FIG. 1, the display 130 may be divided into areas based on another folding area (e.g., a folding area parallel to the x-axis) or another folding axis (e.g., a folding axis parallel to the x-axis) in yet another embodiment. The above division of area in the display is only a physical division by the pair of housings 110 and 120 and a hinge (e.g., the hinge 164 in FIG. 3), and the display 130 may display substantially one full screen through the pair of housings 110 and 120 and the hinge (e.g., the hinge 164 in FIG. 3). In yet another embodiment, the first area 131*a* and the second area 131*b* may have a substantially symmetric shape as a whole with respect to the folding area 131*c*. However, unlike the second area 131*b*, the first area 131*a* may include a notch area (e.g., the notch area 133 in FIG. 3) cut according to the presence of the sensor area 131*d*, and may have a substantially symmetric shape to the second area 131*b* in other areas (e.g., areas other than the notch area). For example, the first area 131*a* and the second area 131*b* may include portions having a symmetric shape to each other and portions having an asymmetric shape to each other.

In yet another embodiment, each of the display 130 (e.g., the first display) and the second display 152 (e.g., the sub-display) may include fingerprint sensing areas (e.g., first fingerprint contact portion 1301, a second fingerprint contact portion 1521, and a third fingerprint contact portion 1302). The fingerprint contact portions 1301, 1302, and 1521 may be at least partial areas of the displays 130 and 152 that come into contact with the user's fingerprint.

The fingerprint sensing area may be, for example, an area in which a fingerprint sensor (or a fingerprint recognition module) is embedded, and each fingerprint sensing areas may be disposed so as not to overlap each other on the display 130 and/or second display 152 (i.e., sub-display) when viewed in the z-axis direction.

In yet another embodiment, the fingerprint contact portions 1301, 1302, and 1521 may include a first fingerprint contact portion 1301 for detecting a fingerprint through at least a portion of the display 130 forming the third surface 121 and a second fingerprint contact portion 1521 for detecting a fingerprint through at least a portion of the second display 152 (i.e., sub-display). Other elements (e.g., a first reflective member and a second reflective member) of the fingerprint recognition module may be disposed in at least portions of the inner space of the second housing 120 corresponding to the first fingerprint contact portion 1301 and the second fingerprint contact portion 1521, respectively. For example, the first reflective member may be disposed in an area corresponding to the first fingerprint contact portion 1301 in the inner space of the second housing 120, and the second reflective member may be disposed in an area corresponding to the second fingerprint contact portion 1521 in the inner space of the second housing 120. The first reflective member and the second reflective member may be disposed so as not to overlap each other when viewed in the z-axis direction.

In yet another embodiment, the fingerprint contact portions 1301, 1302, and 1521 may include a first fingerprint contact portion 1301 for detecting a fingerprint through at least a portion of the display 130 forming the third surface 121, a second fingerprint contact portion 1521 for detecting a fingerprint through at least a portion of the second display 152 (i.e., sub-display), and/or a third fingerprint contact portion 1302 for detecting a fingerprint through at least a portion of the display 130 forming the first surface 111. The first fingerprint contact portion 1301 and the second fingerprint contact portion 1521 may be disposed in the second housing 120 so as not to overlap each other when viewed in the z-axis direction, and the third fingerprint contact portion 1302 may be disposed in the first housing 110.

Figure 3:
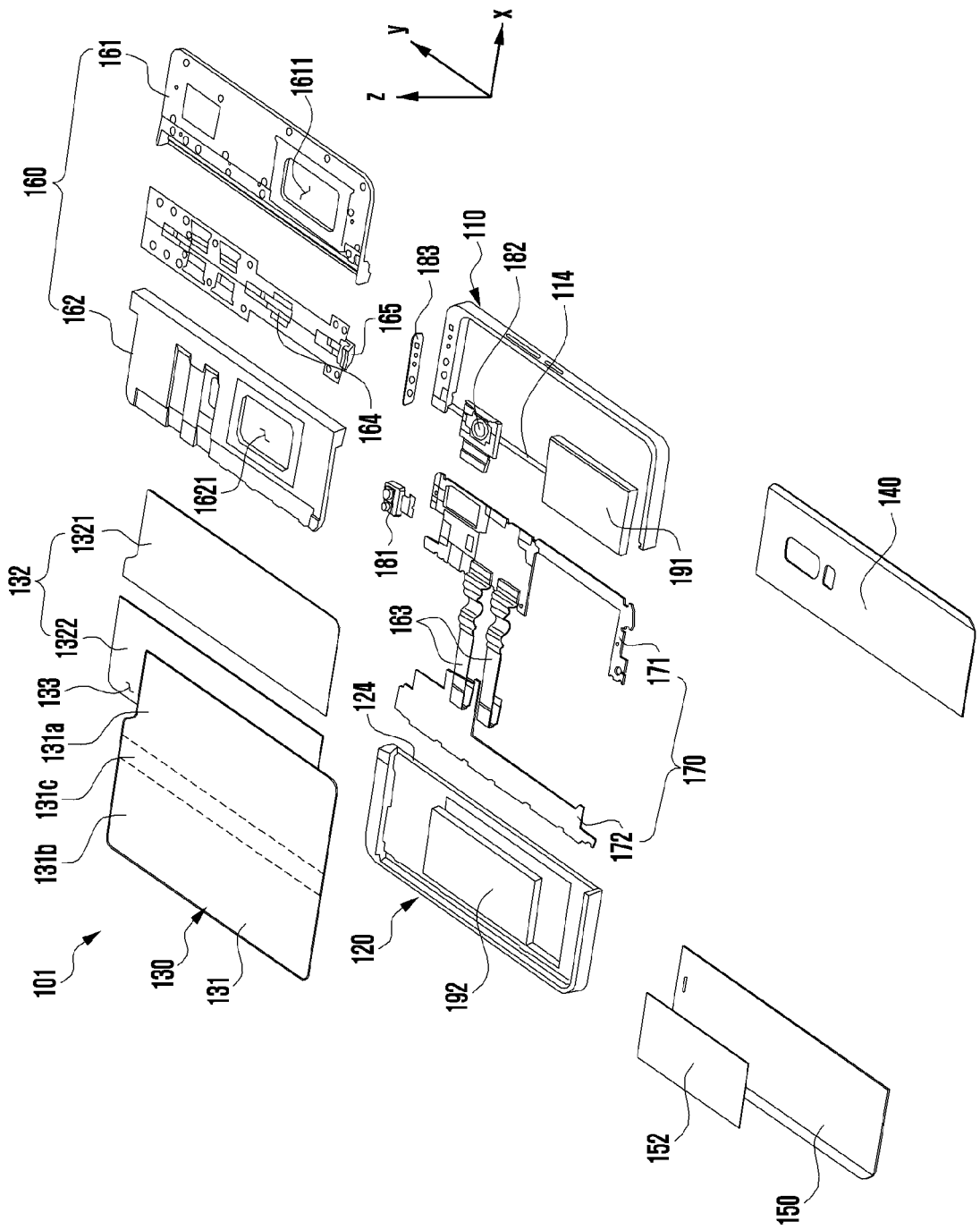
FIG. 3 is an exploded perspective view of an electronic device according to an embodiment of the disclosure.

Referring to FIG. 2, the hinge cover 165 may be disposed between the first housing 110 and the second housing 120 to cover internal components (e.g., the hinge 164 in FIG. 3). In yet another embodiment, the hinge cover 165 may be covered by a portion of the first housing 110 and/or the second housing 120 or may be exposed to the outside depending on an operation state (e.g., a flat or unfolded state or a folded state) of the electronic device 101. At least one of the elements of the electronic device 101 shown in FIG. 2 may be similar to at least one of the elements of the electronic device 101 shown in FIG. 1, and a redundant description thereof will be omitted below.

For example, as shown in FIG. 1, when the electronic device 101 is in an unfolded state, the hinge cover 165 may covered by the first housing 110 and the second housing 120 so as not to be exposed. For example, as shown in FIG. 2, when the electronic device 101 is in a folded state (e.g., a completely folded state), the hinge cover 165 may be exposed to the outside between the first housing 110 and the second housing 120. For example, in an intermediate state in which the first housing 110 and the second housing 120 are folded with a certain angle, the hinge cover 165 may be at least partially exposed to the outside of the electronic device 101 between the first housing 110 and the second housing 120. In this case, the exposed area may be less than that in the fully folded state. In yet another embodiment, the hinge cover 165 may include a curved surface.

Hereinafter, the operation of the first housing 110 and the second housing 120 and respective areas of the display 130 depending on the operation state of the electronic device 101 (e.g., a flat or unfolded state and a folded state) will be described.

In yet another embodiment, when the electronic device 101 is in a flat state (e.g., the state in FIG. 1), the first housing 110 and the second housing 120 may have a first angle (e.g., about 180 degrees) therebetween, and the first area 131a and the second area 131b of the display may be arranged to be directed in substantially the same direction. In addition, the folding area 131c may form substantially the same plane as the first area 131a and the second area 131b. In yet another embodiment, when the electronic device 101 is in a flat state (or unfolded state), the first housing 110 and the second housing 120 may rotate at a second angle (e.g., about 360 degrees) relative to each other to be reversely folded such that the second surface 112 and the fourth surface 122 face each other.

In yet another embodiment, when the electronic device 101 is in the folded state (e.g., the state in FIG. 2), the first housing 110 and the second housing 120 may be disposed to face each other. The first area 131a and the second area 131b of the display 130 may form a narrow angle (e.g., between about 0 and 10 degrees) to face each other. The folding area 131c may be configured, for example, as a curved surface at least a portion of which has a predetermined curvature.

In yet another embodiment, when the electronic device 101 is in the intermediate state, the first housing 110 and the second housing 120 may be disposed at a certain angle (e.g., about 90 degrees) therebetween. For example, the first area 131a and the second area 131b of the display 130 may form an angle greater than that in the folded state and less than that in the unfolded state. For example, at least a portion of the folding area 131c may be configured as a curved surface having a predetermined curvature, and the curvature may be smaller than that in the folded state.

According to various embodiments, the hinge 164 may be provided in a vertical direction or a horizontal direction when the electronic device 101 is viewed from above. According to various embodiments, a plurality of hinges 164 may be provided. For example, all of the plurality of hinges may be arranged in the same direction. In another example, some of the plurality of hinges may be arranged in different directions and folded.

FIG. 3 is an exploded perspective view of an electronic device 101 according to an embodiment of the disclosure. At least one of the elements of the electronic device 101 shown in FIG. 3 may be similar to at least one of the elements of the electronic device 101 shown in FIG. 1 or the electronic device 101 in FIG. 2, and a redundant description thereof will be omitted below.

Referring to FIG. 3, in another embodiment, the electronic device 101 may include a display 130, a support member assembly 160 (or a support member), at least one printed circuit board (hereinafter, PCB) 170, a first housing 110, a second housing 120, a first rear cover 140, and a second rear cover 150. In this document, the display 130 (e.g., the first display) may be referred to as a display module or a display assembly.

In yet another embodiment, the display 130 may include a display panel 131 (e.g., a flexible display panel) and one or more plates 132 or layers on which the display panel 131 is mounted. In yet another embodiment, the plate 132 may be disposed between the display panel 131 and the support member assembly 160. A display panel 131 may be disposed on at least a portion of one surface of the plate 132. The plate 132 may include a first plate 1321 and a second plate 1322 that are separated based on a hinge 164. The plate 132 may include at least one member that cannot be folded together when the first housing 110 and the second housing 120 rotate around the hinge 164 to be folded and/or unfolded. The plate 132 may include at least one sub-material layer (e.g., a graphite member) and/or a conductive plate (e.g., a Cu sheet) disposed on the rear surface of the display panel 131. In yet another embodiment, the plate 132 may be formed in a shape corresponding to the display panel 131. For example, a partial area of the first plate 1321 may be formed in a shape corresponding to the notch area 133 of the display panel 131.

In yet another embodiment, the support member assembly 160 may include a first support member 161 (e.g., a first support plate), a second support member 162 (e.g., a second support plate), a hinge 164 disposed between the first support member 161 and the second support member 162, a hinge cover 165 that covers the same when the hinge 164 is viewed from the outside, and at least one wiring member 163 (e.g., a flexible printed circuit board (hereinafter, FPCB)) crossing the first support member 161 and the second support member 162.

In yet another embodiment, the support member assembly 160 may be disposed between the plate 132 and the at least one PCB 170. For example, the first support member 161 may be disposed between the first area 131a of the display 130 and the first PCB 171. The second support member 162 may be disposed between the second area 131b of the display 130 and the second PCB 172.

In yet another embodiment, at least a portion of the wiring member 163 and the hinge 164 may be disposed inside the support member assembly 160. The wiring member 163 may be disposed in a direction (e.g., the x-axis direction) crossing the first support member 161 and the second support member 162. The wiring member 163 may be disposed in a direction (e.g., the x-axis direction) perpendicular to the folding axis (e.g., the y-axis or the folding axis A in FIG. 1) of the folding area 131c.

In yet another embodiment, at least one PCB 170, as mentioned above, may include a first PCB 171 disposed on the first support member 161 and a second PCB 172 disposed on the second support member 162. The first PCB 171 and the second PCB 172 may be disposed in a space formed by the support member assembly 160, the first housing 110, the second housing 120, the first rear cover 140, and the second rear cover 150. Components for implementing various functions of the electronic device 101 may be mounted on the first PCB 171 and the second PCB 172.

In yet another embodiment, the first PCB 171 disposed in the space formed through the first support member 161, a first battery 191 disposed at a position facing a first swelling hole 1611 of the first support member 161, and at least one sensor module 181 or at least one camera module 182 may be provided in a first space of the first housing 110. The first housing 110 may include a window glass 183 disposed in a position corresponding to the notch area 133 of the display 130 to protect at least one sensor module 181 and at least one camera module 182. In yet another embodiment, a second PCB 172 disposed in a second space formed through a second support member 162 and a second battery 192 disposed at a position facing a second swelling hole 1621 of the second support member 162 may be provided in a second space of the second housing 120. According to yet another embodiment, the first housing 110 and the first support member 161 may be integrally formed. According to an embodiment, the second housing 120 and the second support member 162 may also be integrally formed. According to yet another embodiment, the second display 152 (i.e., sub-display) may be disposed in the second space of the second housing 120. According to yet another embodiment, the second display 152 (e.g., the sub-display) may be disposed to be visible from the outside through at least a partial area of the second rear cover 150.

In yet another embodiment, the first housing 110 may include a first rotation support surface 114, and the second housing 120 may include a second rotation support surface 124 corresponding to the first rotation support surface 114. The first rotation support surface 114 and the second rotation support surface 124 may include curved surfaces corresponding to the curved surfaces included in the hinge cover 165.

In yet another embodiment, when the electronic device 101 is in the unfolded state (e.g., the state in FIG. 1), the first rotation support surface 114 and the second rotation support surface 124 may cover the hinge cover 165 such that the hinge cover 165 may not be exposed through the rear surface of the electronic device 101 or may be minimally exposed therethrough. In yet another embodiment, when the electronic device 101 is in the folded state (e.g., the state in FIG. 2), the first rotation support surface 114 and the second rotation support surface 124 may rotate along the curved surfaces included in the hinge cover 165 such that the hinge cover 165 may be maximally exposed through the rear surface of the electronic device 101.

Figure 4:
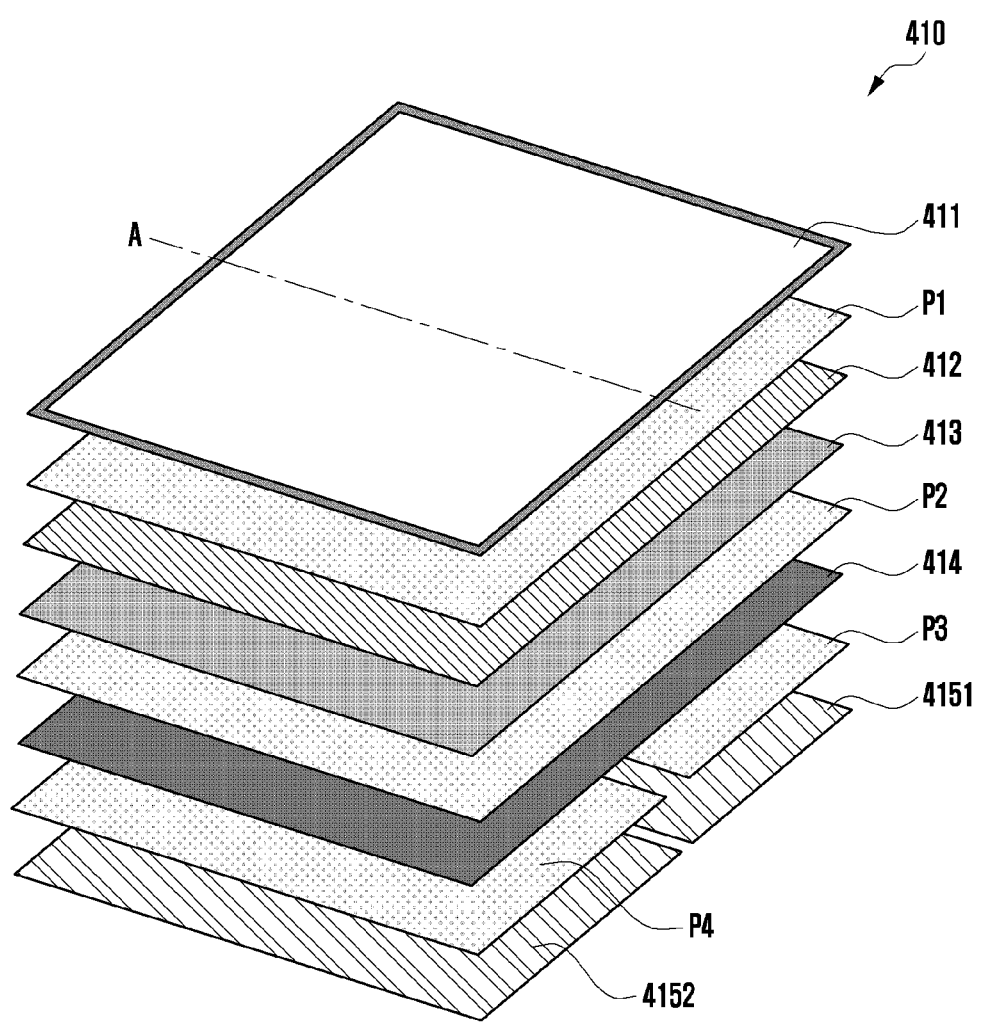
FIG. 4 is an exploded perspective view illustrating a stacked structure of a first display according to an embodiment of the disclosure.

FIG. 4 is an exploded perspective view illustrating a stacked structure of a first display according to an embodiment of the disclosure.

A first display 410 in FIG. 4 may be at least partially similar to the display 130 in FIG. 3 or may further include other embodiments of the display.

Referring to FIG. 4, according to various embodiments, the first display 410 may include a window 411 (e.g., a polyimide (PI) film), and a polarizer (POL) 412 (e.g., a polarizing film), a display panel 413, a polymer member 414, and a pair of conductive members 4151 and 4152, which are sequentially disposed on the rear surface of the window 411. According to an embodiment, the window 411, the POL 412, the display panel 413, and/or the polymer member 414 may be disposed to cross at least a portion of a first surface (e.g., the first surface 111 in FIG. 1) of a first housing (e.g., the first housing 110 in FIG. 1) and a third surface (e.g., the third surface 121 in FIG. 1) of a second housing (e.g., the second housing 120 in FIG. 1) such that a folding area facing a hinge (e.g., the hinge 164 in FIG. 3) is configured to be foldable according to a folding or unfolding operation of an electronic device (e.g., the electronic device 101 in FIG. 1). According to another embodiment, the pair of conductive members 4151 and 4152 may include a first conductive member 4151 disposed in an area facing the first housing 110 and a second conductive member 4152 disposed in an area facing the second housing 120, excluding the folding area, due to the characteristic in which they cannot be bent. According to yet another embodiment, the window 411, the POL 412, the display panel 413, the polymer member 414, and the pair of conductive members 4151 and 4152 may be attached to each other by adhesive members P1, P2, P3, and P4. For example, the adhesive members P1, P2, P3, and P4 may include at least one of an optical clear adhesive (OCA), a pressure sensitive adhesive (PSA), a heat-responsive adhesive, a general adhesive, and a double-sided tape.

According to various embodiments, a dark color (e.g., black) may be applied to the polymer member 414 to assist the display in implementing background when it is turned off. According to yet another embodiment, the polymer member 414 may act as a cushion for absorbing an impact from the outside of the electronic device to prevent the first display 410 from being damaged.

According to yet another embodiment, the pair of conductive members 4151 and 4152 are metal plates, which may help to reinforce the rigidity of the electronic device, shield ambient noise, and dissipate heat emitted from surrounding heat-emitting components. According to yet another embodiment, the conductive members 4151 and 4152 may include at least one of Cu, Al, SUS, or CLAD (e.g., a stacking member in which SUS and Al are alternately arranged). According to yet another embodiment, the first conductive member 4151 and the second conductive member 4152 may be attached to the polymer member 414 through the adhesive members P3 and P4. In this case, the two adhesive members P3 and P4 are arranged to have a greater distance than the distance between the two conductive members 4151 and 4152, thereby preventing interference between the adhesive members P3 and P4 and/or intrusion into the folding area when the two conductive members 4151 and 4152 are folded.

According to various embodiments, the first display 410 may include at least one functional member disposed between the polymer member 414 and the conductive members 4151 and 4152. According to yet another embodiment, the functional member may include a graphite sheet for heat dissipation, an added display, a force-touch FPCB, a fingerprint sensor FPCB, an antenna radiator for communication, a heat dissipation sheet, a conductive/non-conductive tape, or an open cell sponge. According to yet another embodiment, if the functional member is bendable, the functional member may be disposed from the first housing 110 to at least a portion of the second housing 120 through the hinge 164. In yet another embodiment, if the functional member is not bendable, the functional member is may be separately disposed in the area facing the first housing 110 and the area facing the second housing 120, excluding the folding area facing the hinge 164. In yet another embodiment, the first display 410 may further include a detection member for detecting an input by a writing member in an electromagnetic induction method. According to yet another embodiment, the detection member may include a digitizer.

In yet another embodiment, stacked structures (e.g., the polymer member 414 and the pair of conductive members 4151 and 4152) disposed under the display panel 413 of the first display 410 may be removed (or patterned) in a portion where they overlap the fingerprint sensor, thereby increasing the transmittance of the corresponding area. For example, at least a portion of the stacked structures disposed under the display panel 413 may be removed (or patterned) in the portions corresponding to (or overlapping) the first fingerprint contact portion 1301, the second fingerprint contact portion 1521, and/or the third fingerprint contact portion 1302 shown in FIG. 1.

Figure 5:
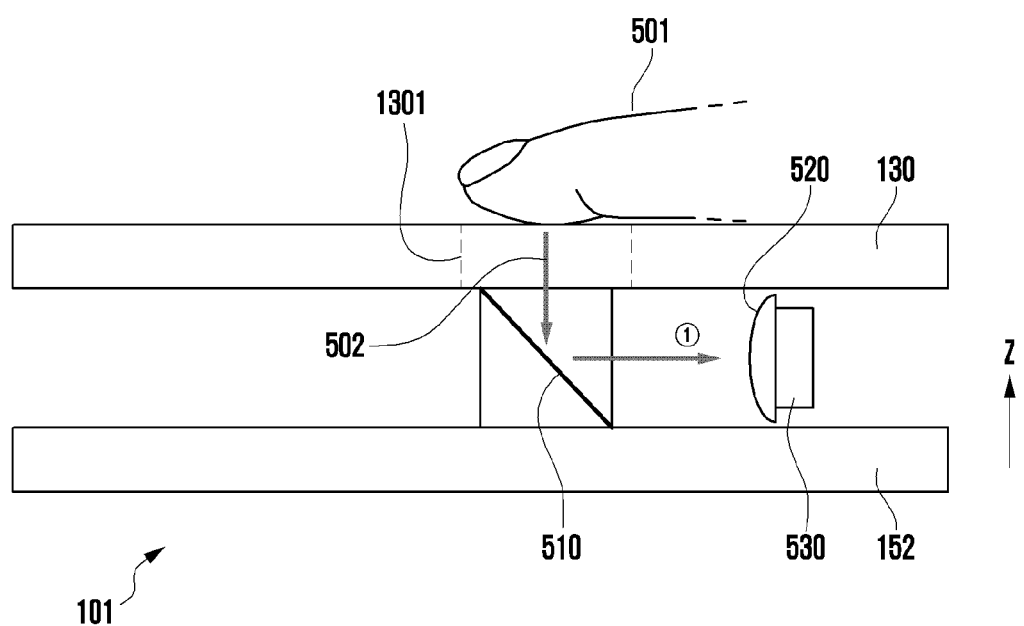
FIG. 5 is a cross-sectional view schematically illustrating the structure of a display and a fingerprint recognition module according to an embodiment of the disclosure.

FIG. 5 is a cross-sectional view schematically illustrating a structure of a display and a fingerprint recognition module according to an embodiment of the disclosure.

Referring to FIG. 5, the fingerprint recognition module included in the electronic device 101 may include a fingerprint contact portion 1301 (e.g., the first fingerprint contact portion 1301 in FIG. 1), a reflective member 510, a lens 520, and an image sensor 530. Referring to FIG. 5, at least some of the respective elements of the fingerprint recognition module may be disposed inside a housing (e.g., 110 or 120 in FIG. 1) of the electronic device 101. The housing (e.g., the second housing 120 in FIG. 1) may be disposed in the space between a first display 130 (e.g., the first display 130 in FIG. 1) and a second display 152 (e.g., the second display 152 in FIG. 1).

According to various embodiments, the fingerprint contact portion 1301 may be formed in at least a partial area of the first display 130, and the transmitted light 502 may pass through the fingerprint contact portion 1301. According to an embodiment, the fingerprint contact portion 1301 may transmit the transmitted light 502 corresponding to the user's fingerprint into the housing when the user's finger 501 comes into contact therewith. According to an embodiment, the fingerprint contact portion 1301 may include an area where the stacked structures (e.g., the polymer member 414 in FIG. 4 and the pair of conductive members 4151 and 4152 in FIG. 4) disposed under the display panel (e.g., the display panel 413 in FIG. 4) are removed (or patterned) from the stacked structures of the first display 130 in a portion overlapping the fingerprint sensor. For example, at least a portion of the stacked structures disposed under the display panel 413 may be removed (or patterned) in the area corresponding to (or overlapping) the fingerprint contact portion 1301. According to an embodiment, the transmitted light 502 passing through the fingerprint contact portion 1301 may include at least some of the light that is emitted from the display panel (e.g., the display panel 413 in FIG. 4) to the outside and reflected by a finger 501 in contact therewith, thereby passing through the same again. Accordingly, the electronic device 101 may obtain a fingerprint image based on the transmitted light information.

According to various embodiments, the reflective member 510 may reflect the transmitted light 502 passing through the fingerprint contact portion 1301 in a predetermined direction. According to an embodiment, the reflective member 510 may be disposed to reflect the transmitted light 502 in a predetermined direction (e.g., a first direction). For example, the reflective member 510 may be disposed to reflect the transmitted light 502 from the reflective member 510 to a path (e.g., a path ①) toward the image sensor 530. According to an embodiment, the reflective member 510 may include a mirror. According to an embodiment, the reflective member 510 may include a dichroic material that reflects light having a wavelength in a predetermined range and transmits light having a wavelength in the remaining range. For example, a dichroic film may be attached to at least a partial area of the reflective member 510. According to an embodiment, the reflective member 510 may have a shape corresponding to any one of a flat mirror, a concave mirror, and a convex mirror. According to an embodiment, when the reflective member 510 has a shape of a concave mirror or a convex mirror, the lens 520 may not be included. For example, the reflective member 510 may have a curvature corresponding to a magnification that makes the transmitted light 502 have the length of the entire path (e.g., a path ①) formed from the fingerprint contact portion 1301 to the image sensor 530.

According to various embodiments, the lens 520 may refract the transmitted light 502 reflected in a predetermined direction (e.g., the first direction) at a predetermined magnification. According to an embodiment, the lens 520 may have a curvature corresponding to a magnification that makes the transmitted light 502 have the length of the entire path (e.g., the path ①) formed from the fingerprint contact portion 1301 to the image sensor 530.

According to various embodiments, the image sensor 530 may receive the transmitted light 502 and convert the same into an electrical signal. According to an embodiment, the image sensor 530 may include a plurality of pixels including a light-receiving element that converts incident light into an electrical signal. According to an embodiment, the image sensor 530 may be disposed on a printed circuit board included in the housing (e.g., the second housing 120 in FIG. 1), and may include a circuit configured in the form of an application-specific integrated circuit (ASIC). According to an embodiment, the image sensor 530 may be electrically connected to a processor (e.g., the processor 1420 in FIG. 14) and transmit an image generated by receiving the transmitted light 502 to the processor 1420.

Figure 6:
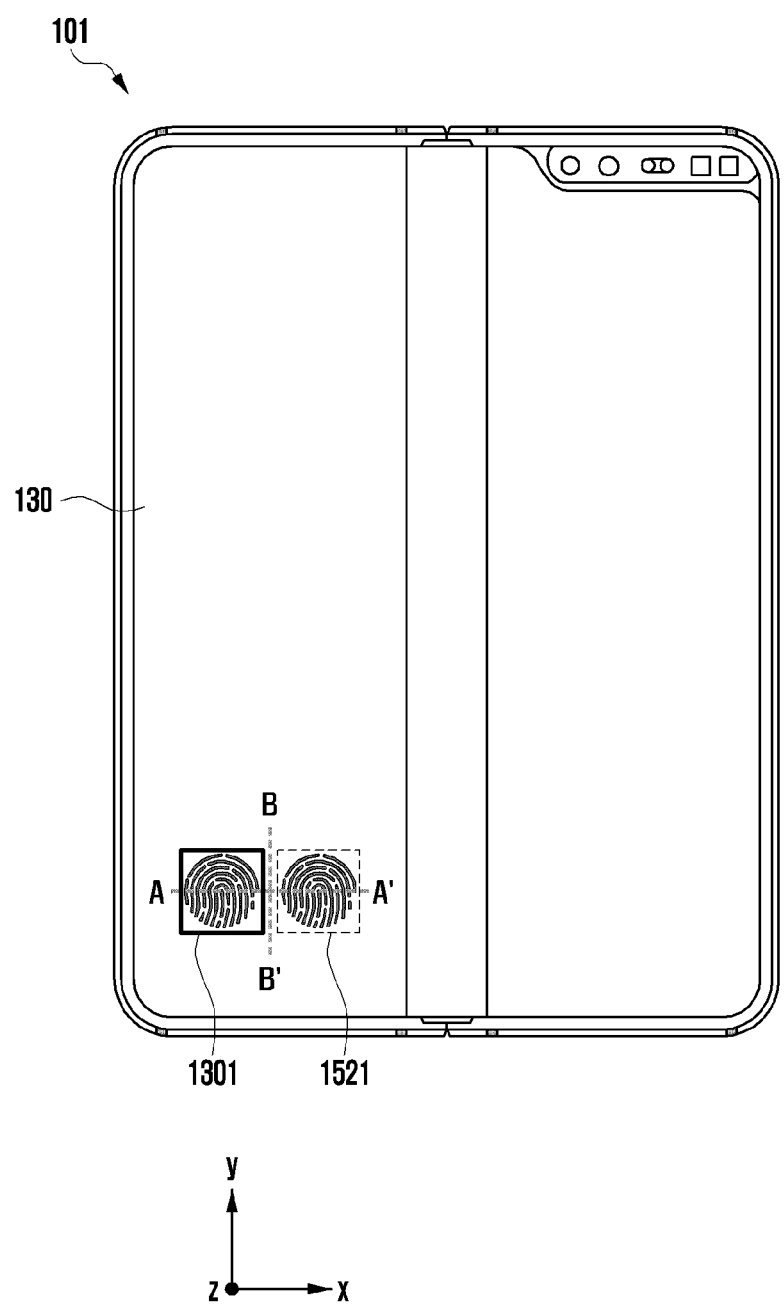
FIG. 6 is a diagram illustrating a positional relationship in which a first fingerprint contact portion and a second fingerprint contact portion are disposed according to an embodiment of the disclosure.

FIG. 6 is a diagram illustrating a positional relationship in which a first fingerprint contact portion and a second fingerprint contact portion are disposed according to an embodiment of the disclosure.

Figure 7:
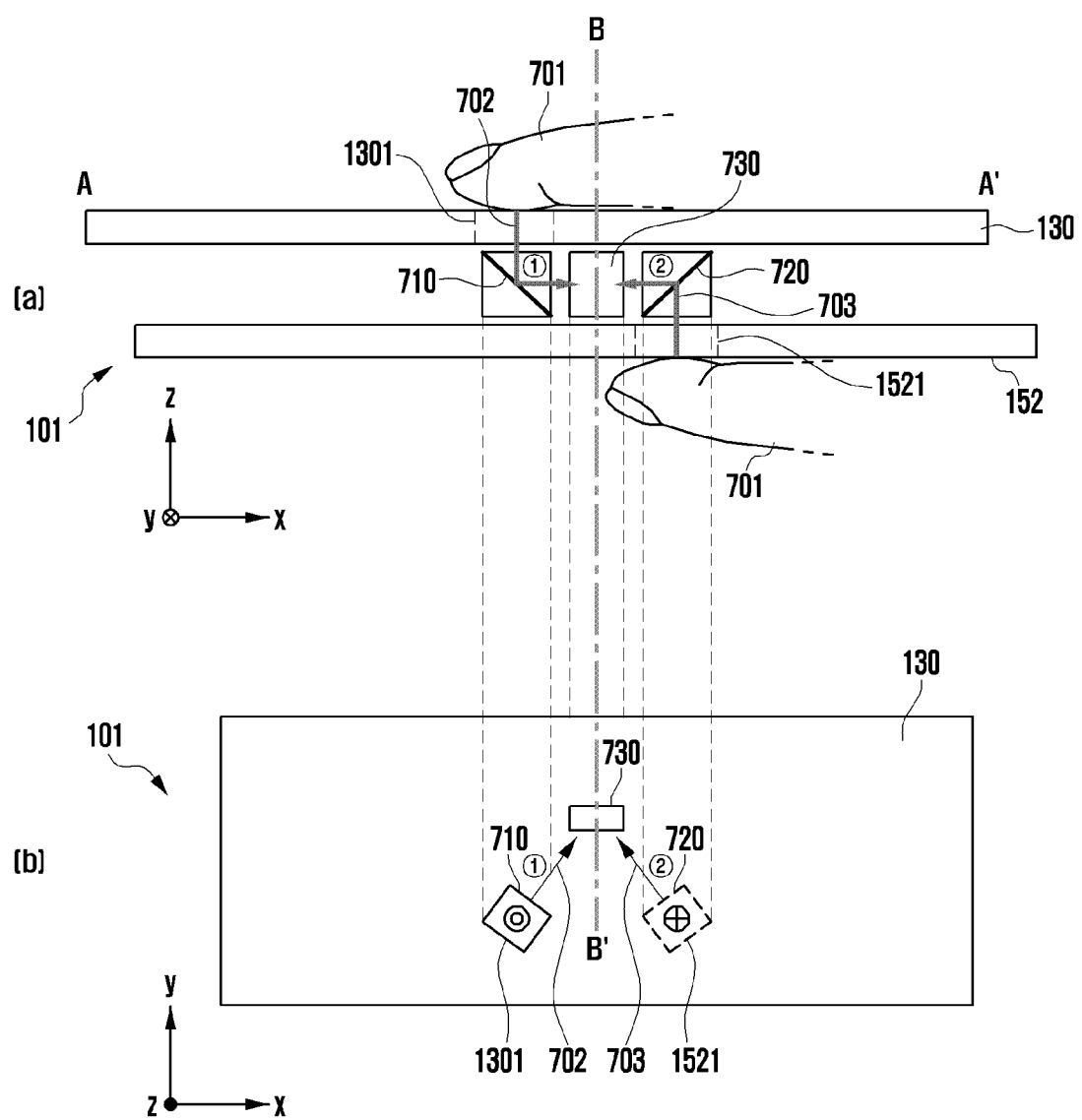
FIG. 7 is a view illustrating arrangement of a first reflective member, a second reflective member, and an image sensor according to an embodiment of the disclosure.

FIG. 7 is a view illustrating arrangement of a first reflective member, a second reflective member, and an image sensor according to an embodiment of the disclosure.

FIG. 6 shows a first display of an electronic device in an unfolded state (e.g., the state in FIG. 1) when viewed in the z-axis direction. Part (a) of FIG. 7 shows a cross-section of the electronic device 101 taken along line AA' in FIG. 6. Part (b) of FIG. 7 shows arrangement of the first reflective member 710, the second reflective member 720, and the image sensor 730 when the first display 130 is viewed in the z-axis direction.

Referring to FIG. 6, the electronic device 101 may include a plurality of fingerprint contact portions (e.g., the first fingerprint contact portion 1301 and the second fingerprint contact portion 1521). According to an embodiment, the first fingerprint contact portion 1301 may be disposed in at least a partial area of the first display 130. According to another embodiment, the second fingerprint contact portion 1521 may be disposed in at least a partial area of the second display (e.g., the second display 152 in FIG. 1). According to another embodiment, the plurality of fingerprint contact portions 1301 and 1521 may be disposed on the first display 130 and/or the second display 152 so as not to overlap when viewed in the z-axis direction. Referring to FIG. 6, although the first fingerprint contact portion 1301 and the second fingerprint contact portion 1521 are illustrated as being disposed on a straight line (e.g., line AA') parallel to the x-axis, they are not limited thereto, and the first fingerprint contact portion 1301 may be disposed at various positions on the first display 130 and the second fingerprint contact portion 1521 may be disposed at various positions on the second display 152 such that they do not overlap each other when viewed in the z-axis direction.

Referring to part (a) of FIG. 7, the electronic device 101 may include a plurality of reflective members (e.g., a first reflective member 710 and a second reflective member 720) and an image sensor 730 between the first display 130 and the second display 152.

According to an embodiment, the first reflective member 710 may be disposed at a position corresponding to the first fingerprint contact portion 1301. For example, the first reflective member 710 may be disposed on a straight line with the first fingerprint contact portion 1301 in the z-axis direction. According to another embodiment, a first light 702 may be transmitted through the first fingerprint contact portion 1301. According to yet another embodiment, when a user's finger 701 comes into contact with the first fingerprint contact portion 1301, a first light 702 corresponding to a user's fingerprint may be transmitted into the housing. According to yet another embodiment, the first light 702 transmitted through the first fingerprint contact portion 1301 may include at least some of the light that is emitted from the display panel (e.g., the display panel 413 in FIG. 4) to the outside and reflected by the finger 701 in contact therewith, thereby passing through the same again. According to yet another embodiment, the first light 702 may be reflected by the first reflective member 710. The first light 702 may be reflected by the first reflective member 710 to form a predetermined path (e.g., a path ①). For example, the first reflective member 710 may be disposed at an angle at which the first light 702 may form the path ①. According to yet another embodiment, the path ① may include a path from the first reflective member 710 to the image sensor 730. For example, the first reflective member 710 may be disposed at a position and an angle forming a path (e.g., the path ①) in which the first light 702 is reflected and travels toward the image sensor 730.

According to yet another embodiment, the second reflective member 720 may be disposed at a position corresponding to the second fingerprint contact portion 1521. For example, the second reflective member 720 may be disposed on a straight line with the second fingerprint contact portion 1521 in the z-axis direction. According to yet another embodiment, the second light 703 may be transmitted through the second fingerprint contact portion 1521. According to yet another embodiment, when a user's finger 701 comes into contact with the second fingerprint contact portion 1521, a second light 703 corresponding to a user's fingerprint may be transmitted into the housing. According to yet another embodiment, the second light 703 transmitted through the second fingerprint contact portion 1521 may include at least some of the light that is emitted from the display panel (e.g., the display panel of the second display 152) to the outside and reflected by the finger 701 in contact therewith, thereby passing through the same again. According to yet another embodiment, the second light 703 may be reflected by the second reflective member 720. The second light 703 may be reflected by the second reflective member 720 to form a predetermined path (e.g., a path ②). For example, the second reflective member 720 may be disposed at an angle at which the second light 703 may form the path ②. According to yet another embodiment, the path ② may include a path from the second reflective member 720 to the image sensor 730. For example, the second reflective member 720 may be disposed at a position and an angle forming a path (e.g., the path ②) in which the second light 703 is reflected and travels toward the image sensor 730.

Referring to FIGS. 6 and 7, the first fingerprint contact portion 1301 and the second fingerprint contact portion 1521 may be disposed so as not to overlap on the first display 130 and/or the second display 152 when viewed in the z-axis direction. The first reflective member 710 may be disposed at a position corresponding to the first fingerprint contact portion 1301, the second reflective member 720 may be disposed at a position corresponding to the second fingerprint contact portion 1521, and the first reflective member 710 and the second reflective member 720 may be disposed so as not to overlap each other. For example, the first reflective member 710 and the second reflective member 720 may be disposed at positions so as not to overlap each other in the z-axis direction. According to yet another embodiment, the first reflective member 710 and the second reflective member 720 may not overlap each other in the z-axis direction, thereby reducing the thickness between the first display 130 and the second display 152. According to yet another embodiment, the first reflective member 710 and the second reflective member 720 may be disposed at positions spaced apart from each other. The first reflective member 710 and the second reflective member 720 may be disposed at positions corresponding to the first fingerprint contact portion 1301 and the second fingerprint contact portion 1521, respectively, and may be disposed at an angle such that the transmitted light (e.g., the first light 702 and the second light 703) form paths (e.g., the path ① and the path ②) toward the image sensor 730. According to yet another embodiment, the respective elements of the fingerprint recognition module, for example, the first fingerprint contact portion 1301, the second fingerprint contact portion 1521, and the image sensor 730, may be disposed at positions forming a triangle when viewed in the z-axis direction. For example, the respective elements (the first fingerprint contact portion 1301, the second fingerprint contact portion 1521, and the image sensor 730) may be disposed at positions corresponding to vertexes of a triangle. For example, the path of the first light 702 (e.g., the path ①) formed by the first reflective member 710 and the path of the second light 703 (e.g., the path ②) formed by the second reflective member 720 may not overlap each other, and the paths of the lights 702 and 703 (the path ① and the path ②) may cross each other at the position of the image sensor 730.

Figure 8:
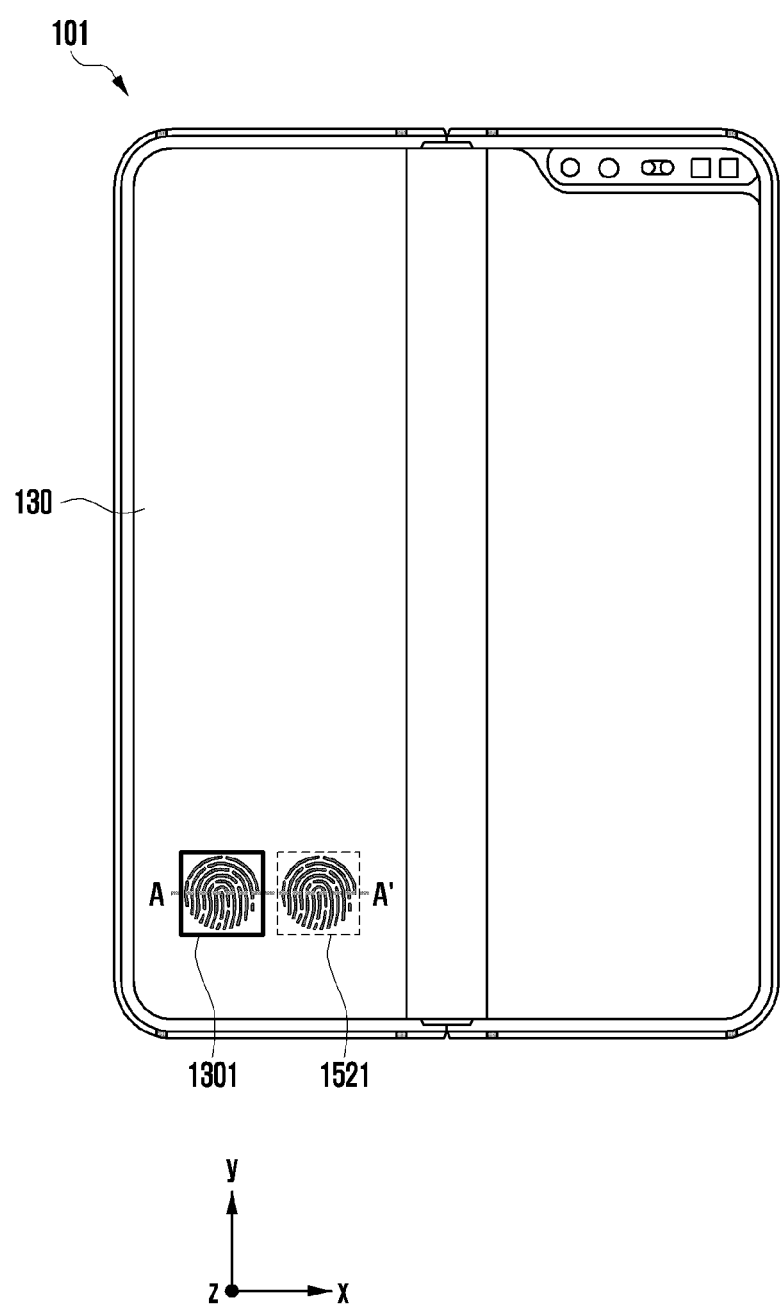
FIG. 8 is a diagram illustrating a positional relationship in which a first fingerprint contact portion and a second fingerprint contact portion are disposed according to an embodiment of the disclosure.

FIG. 8 is a diagram illustrating a positional relationship in which a first fingerprint contact portion and a second fingerprint contact portion are disposed according to an embodiment of the disclosure.

Figure 9:
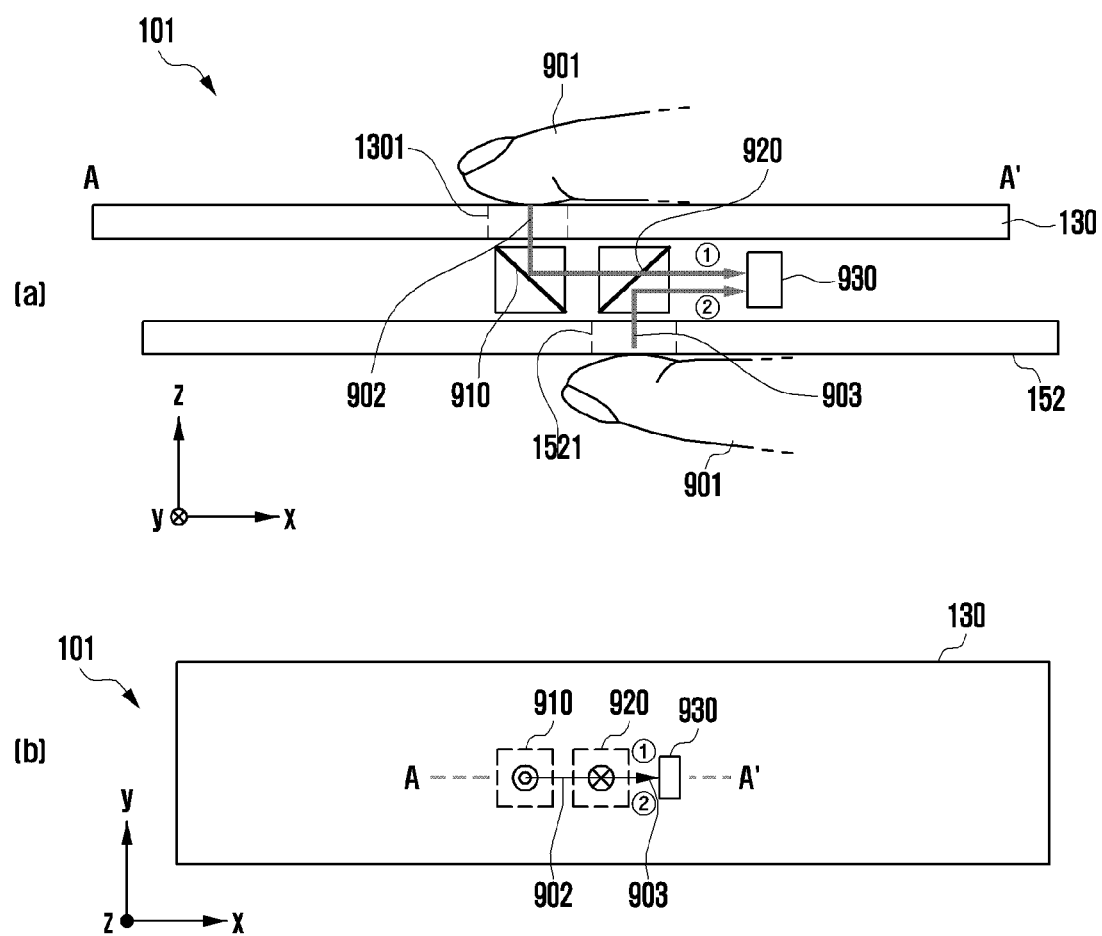
FIG. 9 is a view illustrating arrangement of a first reflective member, a second reflective member, and an image sensor according to an embodiment of the disclosure.

FIG. 9 is a view illustrating arrangement of a first reflective member, a second reflective member, and an image sensor according to an embodiment of the disclosure.

FIG. 8 shows a first display 130 of an electronic device 101 in an unfolded state (e.g., the state in FIG. 1) when viewed in the z-axis direction. Part (a) of FIG. 9 shows a cross-section of the electronic device 101 taken along line AA' in FIG. 8. Part (b) of FIG. 9 shows the positions of a first reflective member 910, a second reflective member 920, and an image sensor 930 when the first display 130 is viewed in the z-axis direction.

Referring to FIG. 8, the electronic device 101 may include a plurality of fingerprint contact portions (e.g., a first fingerprint contact portion 1301 and a second fingerprint contact portion 1521). According to an embodiment, a first fingerprint contact portion 1301 may be disposed in at least a partial area of the first display 130. According to another embodiment, the second fingerprint contact portion 1521 may be disposed in at least a partial area of a second display (e.g., the second display 152 in FIG. 1). According to an embodiment, the plurality of fingerprint contact portions 1301 and 1521 may be disposed on the first display 130 and/or the second display 152 so as not to overlap when viewed in the z-axis direction. Referring to FIG. 8, although the first fingerprint contact portion 1301 and the second fingerprint contact portion 1521 are illustrated as being disposed on a straight line (e.g., the line AA') parallel to the x-axis, the disclosure is not limited thereto, and the first fingerprint contact portions 1301 may be disposed at various positions on the first display 130 and the second fingerprint contact portion 1521 may be disposed at various positions on the second display 152 as long as the first fingerprint contact portion 1301, the second fingerprint contact portion 1521, and the image sensor 930 are arranged in a line without overlapping each other when viewed in the z-axis direction.

Referring to FIGS. 8 and 9, the first reflective member 910, the second reflective member 920, and the image sensor 930 may be disposed in a line. According to various embodiments, respective elements of a fingerprint recognition module, for example, the first fingerprint contact portion 1301, the second fingerprint contact portion 1521, and the image sensor 930, may be disposed in a line (e.g., the line AA') when viewed in the z-axis direction.

According to an embodiment, the first fingerprint contact portion 1301 and the second fingerprint contact portion 1521 may be disposed on the first display 130 and/or the second display 152 so as not to overlap when viewed in the z-axis direction. The first reflective member 910 may be disposed at a position corresponding to the first fingerprint contact portion 1301, and the second reflective member 920 may be disposed at a position corresponding to the second fingerprint contact portion 1521 such that the first reflective member 910 and the second reflective member 920 do not overlap each other. For example, the first reflective member 910 and the second reflective member 920 may be disposed so as not to overlap each other in the z-axis direction. According to another embodiment, the first reflective member 910 and the second reflective member 920 do not overlap each other in the z-axis direction, thereby reducing the thickness between the first display 130 and the second display 152. According to yet another embodiment, the first reflective member 910 and the second reflective member 920 may be disposed at positions spaced apart from each other. The first reflective member 910 and the second reflective member 920 may be disposed at positions corresponding to the first fingerprint contact portion 1301 and the second fingerprint contact portion 1521, respectively, and may be disposed at an angle such that the transmitted lights (e.g., a first light 902 and a second light 903) form paths toward the image sensor 930.

Referring to part (a) of FIG. 9, the electronic device 101 includes a plurality of reflective members (e.g., a first reflective member 910 and a second reflective member 920) and an image sensor 930 between the first display 130 and the second display 152.

According to an embodiment, the first reflective member 910 may be disposed at a position corresponding to the first fingerprint contact portion 1301. For example, the first reflective member 910 may be disposed on a straight line with the first fingerprint contact portion 1301 in the z-axis direction. According to another embodiment, a first light 902 may be transmitted through the first fingerprint contact portion 1301. According to yet another embodiment, when a user's finger 901 comes into contact with the first fingerprint contact portion 1301, a first light 902 corresponding to a user's fingerprint may be transmitted into the housing. According to yet another embodiment, the first light 902 transmitted through the first fingerprint contact portion 1301 may include at least some of the light that is emitted from the display panel (e.g., the display panel 413 in FIG. 4) to the outside and reflected by the finger 901 in contact therewith, thereby passing through the same again. According to an embodiment, the first light 902 may be reflected by the first reflective member 910. The first light 902 may be reflected by the first reflective member 910 to form a predetermined path (e.g., a path ①). For example, the first reflective member 910 may be disposed at an angle at which the first light 902 may form the path ①. According to an embodiment, the path ① may include a path from the first reflective member 910 to the image sensor 930. For example, the first reflective member 910 may be disposed at a position and an angle forming a path (e.g., the path ①) in which the first light 902 is reflected and travels toward the image sensor 930.

According to yet another embodiment, the second reflective member 920 may be disposed at a position corresponding to the second fingerprint contact portion 1521. For example, the second reflective member 920 may be disposed on a straight line with the second fingerprint contact portion 1521 in the z-axis direction. According to an embodiment, a second light 903 may be transmitted through the second fingerprint contact portion 1521. According to yet another embodiment, when a user's finger 901 comes into contact with the second fingerprint contact portion 1521, a second light 903 corresponding to a user's fingerprint may be transmitted into the housing. According to yet another embodiment, the second light 903 transmitted through the second fingerprint contact portion 1521 may include at least some of the light that is emitted from the display panel (e.g., the display panel of the second display 152) to the outside and reflected by the finger 901 in contact therewith, thereby passing through the same again. According to yet another embodiment, the second light 903 may be reflected by the second reflective member 920. The second light 903 may be reflected by the second reflective member 920 to form a predetermined path (e.g., a path ②). For example, the second reflective member 920 may be disposed at an angle at which the second light 903 may form the path ②. According to yet another embodiment, the path ② may include a path from the second reflective member 920 to the image sensor 930. For example, the second reflective member 920 may be disposed at a position and an angle forming a path (e.g., the path ②) in which the second light 903 is reflected and travels toward the image sensor 930.

According to yet another embodiment, the path of the first light 902 (e.g., the path ①) formed by the first reflective member 910 and the path of the second light 903 (e.g., the path ②) formed by the second reflective member 920 may at least partially overlap each other. According to yet another embodiment, the first reflective member 910, the second reflective member 920, and the image sensor 930 may be disposed on a straight line in sequence, and the first light 902 may be reflected from the first reflective member 910, pass through the second reflective member 920, and reach the image sensor 930 along the path (e.g., the path ①). In this case, the path of the first light 902 (e.g., the path ①) may at least partially overlap the path of the second light 903 (e.g., the path ②). In this case, according to yet another embodiment, the second reflective member 920 may include a dichroic material that reflects light having a wavelength in a predetermined range and transmits light having a wavelength in the remaining range. According to yet another embodiment, the second reflective member 920 may reflect light having a wavelength in a first range and transmit light having a wavelength in a second range. Therefore, in the case of the first light 902, only the light having a wavelength in the second range, among the first light 902, may pass through the second reflective member 920 and reach the image sensor 930, and in the case of the second light 903, only the light having a wavelength in the first range may be reflected by the second reflective member 920 and reach the image sensor 930. In this case, a processor (e.g., the processor 1420 in FIG. 14) may be configured to recognize only the image corresponding to the light having a wavelength in the second range, among the images received from the image sensor 930, as a fingerprint image when the electronic device 101 is in the unfolded state. In the unfolded state of the electronic device 101, a fingerprint may be input from the first fingerprint contact portion 1301, and only the light having a wavelength in the second range, among the first light 902 incident from the first fingerprint contact portion 1301, may be input to the image sensor 930 in consideration of the arrangement relationship of the reflective members 910 and 920. Accordingly, the processor 1420 may be configured to recognize the light having a wavelength in the second range as a fingerprint image in the unfolded state of the electronic device 101. In addition, the processor (e.g., the processor 1420 in FIG. 14) may be configured to recognize the light having a wavelength in the first range, among the images received from the image sensor 930, as a fingerprint image when the electronic device 101 is in the folded state. When the electronic device 101 is in the folded state, a fingerprint may be input from the second fingerprint contact portion 1521, and only the light having a wavelength in the first range, among the second light 903 incident from the second fingerprint contact portion 1521, may be input to the image sensor 930 in consideration of the arrangement relationship of the reflective members 910 and 920. Accordingly, the processor 1420 may be configured to recognize the light having a wavelength in the first range as a fingerprint image in the folded state of the electronic device 101.

Although FIG. 9 shows only the case in which the first reflective member 910, the second reflective member 920, and the image sensor 930 are sequentially disposed in a line, this is only for convenience of explanation, and the sequence may vary as long as they are arranged in a line. According to yet another embodiment, the second reflective member 920, the first reflective member 910, and the image sensor 930 may be disposed on a straight line in sequence, and the second light 903 may be reflected from the second reflective member 920, pass through the first reflective member 910, and reach the image sensor 930 along the path (e.g., the path ②). In this case, the path of the second light 903 (e.g., the path ②) may at least partially overlap the path of the first light 902 (e.g., the path ①). In this case, according to yet another embodiment, the first reflective member 910 may include a dichroic material that reflects light having a wavelength in a predetermined range and transmits light having a wavelength in the remaining range. According to yet another embodiment, the first reflective member 910 may reflect light having a wavelength in a first range and transmit light having a wavelength in a second range. Therefore, in the case of the second light 903, only the light having a wavelength in the second range, among the second light 903, may pass through the first reflective member 910 and reach the image sensor 930, and in the case of the first light 902, only the light having a wavelength in the first range may be reflected by the first reflective member 910 and reach the image sensor 930. In this case, a processor (e.g., the processor 1420 in FIG. 14) may be configured to recognize only the image corresponding to the light having a wavelength in the first range, among the images received from the image sensor 930, as a fingerprint image when the electronic device 101 is in the unfolded state. In the unfolded state of the electronic device 101, a fingerprint may be input from the first fingerprint contact portion 1301, and only the light having a wavelength in the first range, among the first light 902 incident from the first fingerprint contact portion 1301, may be input to the image sensor 930 in consideration of the arrangement relationship of the reflective members 910 and 920. Accordingly, the processor 1420 may be configured to recognize the light having a wavelength in the first range as a fingerprint image in the unfolded state of the electronic device 101. In addition, the processor (e.g., the processor 1420 in FIG. 14) may be configured to recognize the light having a wavelength in the second range, among the images received from the image sensor 930, as a fingerprint image when the electronic device 101 is in the folded state. When the electronic device 101 is in the folded state, a fingerprint may be input from the second fingerprint contact portion 1521, and only the light having a wavelength in the second range, among the second light 903 incident from the second fingerprint contact portion 1521, may be input to the image sensor 930 in consideration of the arrangement relationship of the reflective members 910 and 920. Accordingly, the processor 1420 may be configured to recognize the light having a wavelength in the second range as a fingerprint image in the folded state of the electronic device 101.

Figure 10:
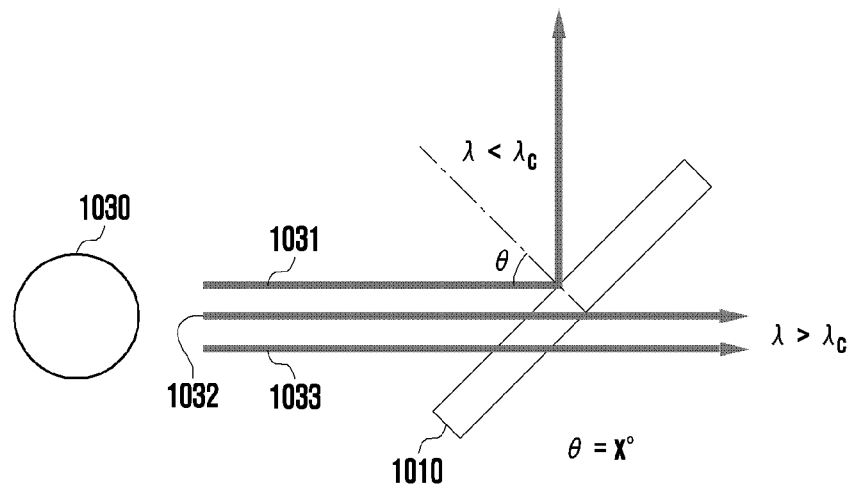
FIG. 10 is a view illustrating a reflective member including a dichroic material according to an embodiment of the disclosure.
Figure 10:
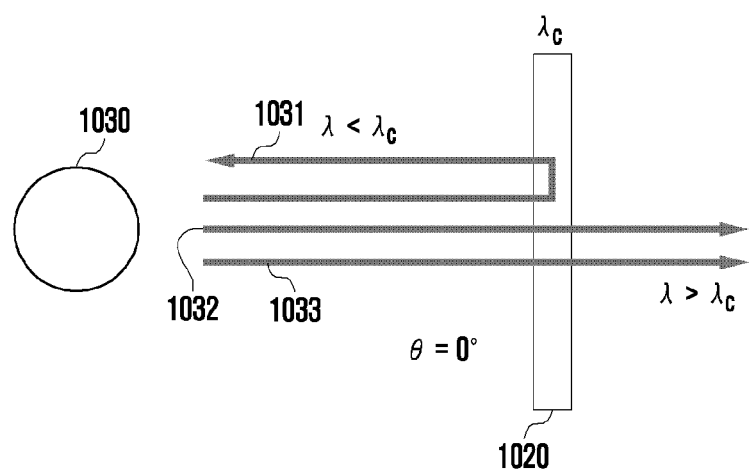

FIG. 10 is a view illustrating reflective members including a dichroic material according to an embodiment of the disclosure.

Part (a) of FIG. 10 shows a reflective member 1010 when the incident angle θ is X degrees.

Part (b) of FIG. 10 shows a reflective member 1020 when the incident angle θ is 0 degrees.

Referring to FIG. 10, the reflective members 1010 and 1020 may have dichroism. According to various embodiments, the reflective members 1010 and 1020 may include a dichroic material. The dichroic material may include a material whose reflection or transmission properties vary depending on the wavelength of incident light. According to an embodiment, the dichroism of the reflective members 1010 and 1020 may vary depending on the incident angle θ of light. According to another embodiment, the reflective members 1010 and 1020 may include a structure in which a plurality of thin films having different refractive indices is stacked in multiple layers. According to yet another embodiment, the reflective members 1010 and 1020 may reflect only the light having a wavelength in a predetermined range (e.g., a wavelength in a first range), among the incident lights (e.g., a first light 1031, a second light 1032, and a third light 1033), and transmit the light having a wavelength in other ranges (e.g., a wavelength in a second range).

Referring to FIG. 10, a light source 1030 may include a first light 1031, a second light 1032, and a third light 1033 having wavelengths in different ranges. The first light 1031, the second light 1032, and the third light 1033 may be understood as, for example, red light, green light, and blue light, respectively. According to yet another embodiment, the reflective members 1010 and 1020 may reflect only the light having a wavelength in the first range and transmit the light having a wavelength in the remaining range (e.g., in the second range), excluding the wavelength in the first range. For example, the first range may be a range having wavelengths greater than a threshold wavelength λ–c–, and the second range may be a range having wavelengths smaller than the threshold wavelength λ–c–. Referring to FIG. 10, the reflective members 1010 and 1020 may reflect reflects only the first light 1031 corresponding to the light having a wavelength in the first range, among the light incident from the light source 1030 (e.g., the first light 1031, the second light 1032, and the third light 1033), and transmit the second light 1032 and the third light 1033 having a wavelength in the second range. According to yet another embodiment, the threshold wavelength λ–c– may have a different value depending on the incident angle θ, and have one or more values. If the threshold wavelength λ–c– has a plurality of values, the range between the plurality of values may correspond to the first range or the second range.

Figure 11:
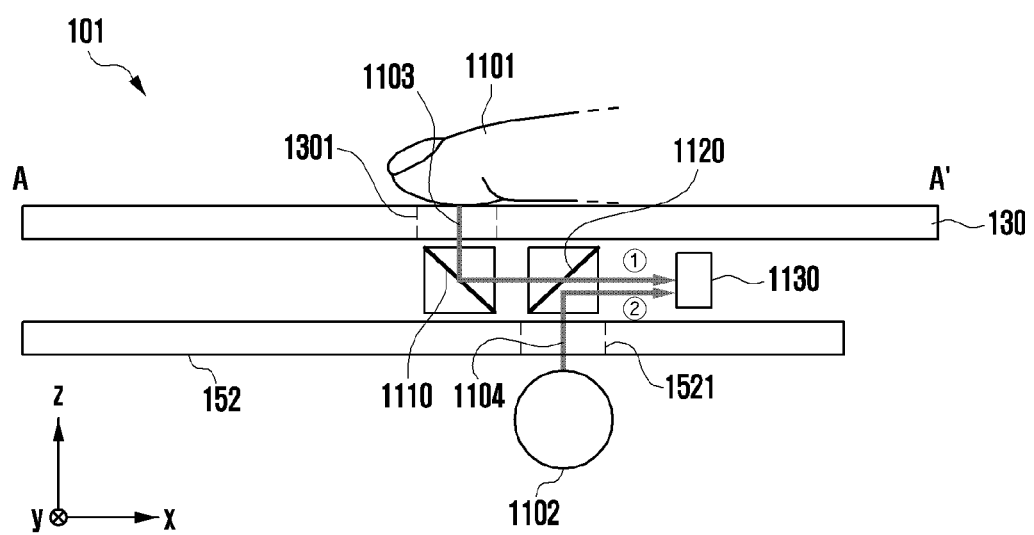
FIG. 11 is a cross-sectional view of a fingerprint recognition module and display in consideration of an external light source according to an embodiment of the disclosure.

FIG. 11 is a cross-sectional view of a fingerprint recognition module and display in consideration of an external light source according to an embodiment of the disclosure.

FIG. 11 may show an unfolded state of the electronic device 101.

Referring to FIG. 11, the first reflective member 1110, the second reflective member 1120, and the image sensor 1130 may be disposed in a line. According to various embodiments, respective elements of a fingerprint recognition module, for example, the first fingerprint contact portion 1301, the second fingerprint contact portion 1521, and the image sensor 930, may be disposed in a line (e.g., the line AA' in FIG. 8) when viewed in the z-axis direction.

According to an embodiment, the first reflective member 1110 may be disposed at a position corresponding to the first fingerprint contact portion 1301. For example, the first reflective member 1110 may be disposed on a straight line with the first fingerprint contact portion 1301 in the z-axis direction. According to another embodiment, a first light 1103 may be transmitted through the first fingerprint contact portion 1301. According to yet another embodiment, when a user's finger 1101 comes into contact with the first fingerprint contact portion 1301, the first light 1103 corresponding to a user's fingerprint may be transmitted into the housing. According to yet another embodiment, the first light 1103 transmitted through the first fingerprint contact portion 1301 may include at least some of the light that is emitted from a display panel (e.g., the display panel 413 in FIG. 4) to the outside and reflected by the finger 1101 in contact therewith, thereby passing through the same again. According to yet another embodiment, the first light 1103 may be reflected by the first reflective member 1110. The first light 1103 may be reflected by the first reflective member 1110 to form a predetermined path (e.g., a path ①). For example, the first reflective member 1110 may be disposed at an angle at which the first light 1103 may form the path ①. According to an embodiment, the path ① may include a path from the first reflective member 1110 to the image sensor 1130. For example, the first reflective member 1110 may be disposed at a position and an angle forming a path (e.g., the path ①) in which the first light 1103 is reflected and travels toward the image sensor 1130.

According to yet another embodiment, the second reflective member 1120 may be disposed at a position corresponding to the second fingerprint contact portion 1521. For example, the second reflective member 1120 may be disposed on a straight line with the second fingerprint contact portion 1521 in the z-axis direction. According to yet another embodiment, a second light 1104 may be transmitted through the second fingerprint contact portion 1521. Referring to FIG. 11, when the electronic device 101 is in the unfolded state, the light transmitted through the second fingerprint contact portion 1521 may be external light (e.g., the second light 1104) from an external light source 1102. The second light 1104 may be transmitted through the second fingerprint contact portion 1521 into the housing. According to yet another embodiment, the second light 1104 may be reflected by the second reflective member 1120. The second light 1104 may be reflected by the second reflective member 1120 to form a predetermined path (e.g., a path ②). For example, the second reflective member 1120 may be disposed at an angle at which the second light 1104 may form the path ②. According to yet another embodiment, the path ② may include a path from the second reflective member 1120 to the image sensor 1130. For example, the second reflective member 1120 may be disposed at a position and an angle forming a path (e.g., the path ②) in which the second light 1104 is reflected and travels toward the image sensor 1130.

According to yet another embodiment, the path of the first light 1103 (e.g., the path ①) formed by the first reflective member 1110 and the path of the second light 1104 (e.g., the path ②) formed by the second reflective member 1120 may at least partially overlap each other. According to yet another embodiment, the first reflective member 1110, the second reflective member 1120, and the image sensor 1130 may be disposed on a straight line in sequence, and the first light 1103 may be reflected from the first reflective member 1110, pass through the second reflective member 1120, and reach the image sensor 1130 along the path (e.g., the path ①). In this case, the path of the first light 1103 (e.g., the path ①) may at least partially overlap the path of the second light 1104 (e.g., the path ②). In this case, according to yet another embodiment, the second reflective member 1120 may include a dichroic material that reflects light having a wavelength in a predetermined range and transmits light having a wavelength in the remaining range. According to yet another embodiment, the second reflective member 1120 may reflect light having a wavelength in a first range and transmit light having a wavelength in a second range. Therefore, in the case of the first light 1103, only the light having a wavelength in the second range, among the first light 1103, may pass through the second reflective member 1120 and reach the image sensor 1130, and in the case of the second light 1104, only the light having a wavelength in the first range may be reflected by the second reflective member 1120 and reach the image sensor 1130. In this case, in consideration of the unfolded state of the electronic device 101 shown in FIG. 11, a processor (e.g., the processor 1420 in FIG. 14) may be configured to recognize only the image corresponding to the light having a wavelength in the second range, among the images received from the image sensor 1130, as a fingerprint image. In the unfolded state of the electronic device 101, a fingerprint may be input from the first fingerprint contact portion 1301, and only the light having a wavelength in the second range, among the first light 1103 incident from the first fingerprint contact portion 1301, may be input to the image sensor 1130 in consideration of the arrangement relationship of the reflective members 1110 and 1120. Accordingly, the processor 1420 may be configured to recognize the light having a wavelength in the second range as a fingerprint image in the unfolded state of the electronic device 101. According to yet another embodiment, the processor 1420 may receive light having a wavelength in the first range and calculate the intensity of the external light source 1102. Only the light having a wavelength in the first range, among the second light 1104 incident from the second fingerprint contact portion 1521, may be input to the image sensor 1130 in consideration of the arrangement relationship of the reflective members 1110 and 1120. Accordingly, the processor 1420 may identify the intensity of the external light source 1102, based on the intensity of the light having a wavelength in the first range. According to yet another embodiment, the processor 1420 may adjust noise and/or contrast of the fingerprint image received through the first light 1103, based on the identified intensity of the external light source 1102.

Although FIG. 11 shows only the case in which the first reflective member 1110, the second reflective member 1120, and the image sensor 1130 are sequentially disposed in a line, this is only for convenience of explanation, and the sequence may vary as long as they are arranged in a line.

According to yet another embodiment, the second reflective member 1120, the first reflective member 1110, and the image sensor 1130 may be disposed on a straight line in sequence, and the second light 1104 may be reflected from the second reflective member 1120, pass through the first reflective member 1110, and reach the image sensor 1130 along the path. In this case, the path of the second light 1104 may at least partially overlap the path of the first light 1103. In this case, according to yet another embodiment, the first reflective member 1110 may include a dichroic material that reflects light having a wavelength in a predetermined range and transmits light having a wavelength in the remaining range. According to yet another embodiment, the first reflective member 1110 may reflect light having a wavelength in a first range and transmit light having a wavelength in a second range. Therefore, in the case of the second light 1104, only the light having a wavelength in the second range, among the second light 1104, may pass through the first reflective member 1110 and reach the image sensor 1130, and in the case of the first light 1103, only the light having a wavelength in the first range may be reflected by the first reflective member 1110 and reach the image sensor 1130. In this case, in consideration of the unfolded state of the electronic device 101, the processor (e.g., the processor 1420 in FIG. 14) may be configured to recognize only the image corresponding to the light having a wavelength in the first range, among the images received from the image sensor 1130, as a fingerprint image. In the unfolded state of the electronic device 101, a fingerprint may be input from the first fingerprint contact portion 1301, and only the light having a wavelength in the first range, among the first light 1103 incident from the first fingerprint contact portion 1301, may be input to the image sensor 1130 in consideration of the arrangement relationship of the reflective members 1110 and 1120. Accordingly, the processor 1420 may be configured to recognize the light having a wavelength in the first range as a fingerprint image in the unfolded state of the electronic device 101. According to yet another embodiment, the processor 1420 may receive light having a wavelength in the second range and calculate the intensity of the external light source 1102. Only the light having a wavelength in the second range, among the second light 1104 incident from the second fingerprint contact portion 1521, may be input to the image sensor 1130 in consideration of the arrangement relationship of the reflective members 1110 and 1120. Accordingly, the processor 1420 may identify the intensity of the external light source 1102, based on the intensity of the light having a wavelength in the second range. According to yet another embodiment, the processor 1420 may adjust noise and/or contrast of the fingerprint image received through the first light 1103, based on the identified intensity of the external light source 1102.

Figure 12:
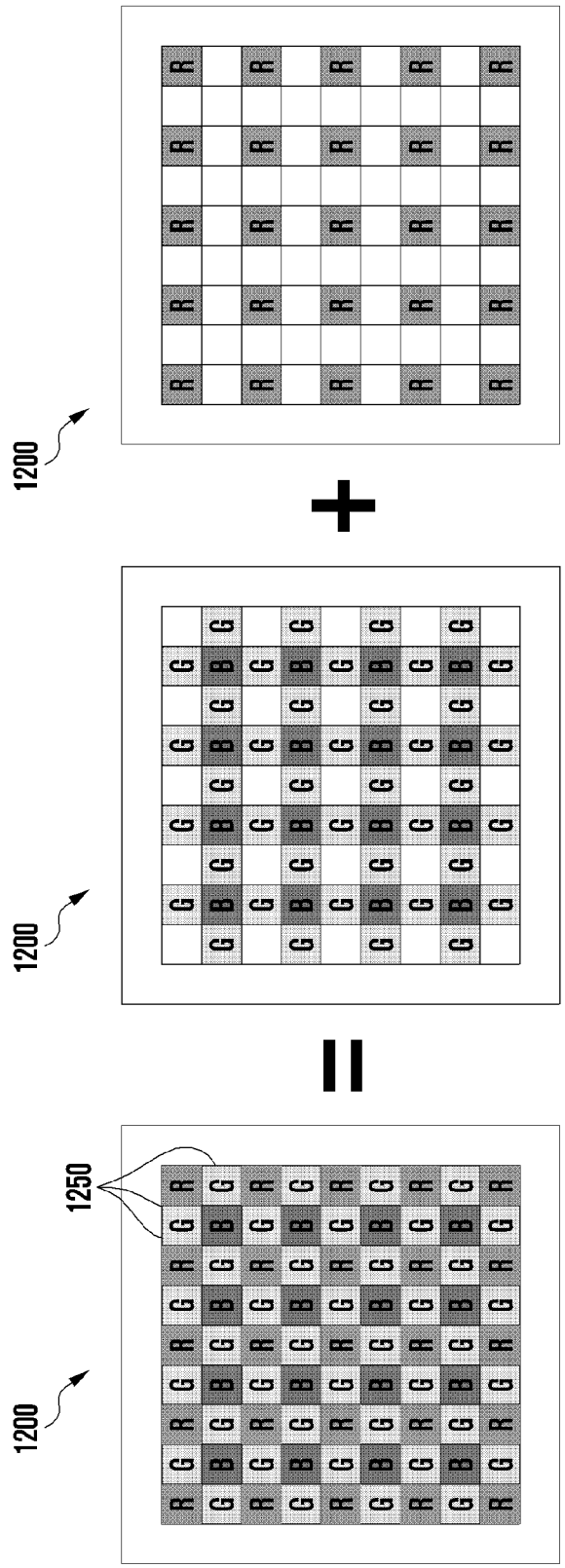
FIG. 12 is a diagram illustrating an image sensor according to an embodiment of the disclosure.

FIG. 12 is a diagram illustrating an image sensor according to an embodiment of the disclosure.

Referring to FIG. 12, an image sensor 1200 may include a plurality of pixels 1250. Each pixel 1250 may include a light receiving element that converts incident light into an electrical signal. The light receiving element included in each pixel 1250 may include at least one RGB element (an element R, an element G, and an element B) that converts visible light of red, green, and blue wavelengths into electrical signals. According to various embodiments, the processor (e.g., the processor 1420 in FIG. 14) may produce first image information using an electrical signal generated from a specific element among the elements of the image sensor 1200, and produce second image information using an electrical signal generated from an element other than the specific element. For example, a first image may be produced using an element (e.g., the element R) that receives light having a wavelength in the first range and generates an electrical signal, and a second image may be produced using an element (e.g., the element G or the element B) that receives light a wavelength in the second range and generates an electrical signal. The processor 1420 may separately process the signals received and generated by the respective elements (e.g., the element R, the element G, and the element B) to distinguish between the images, based on the images generated based on the light reflected from the reflective members having dichroism (e.g., the reflective members 1010 and 1020 in FIG. 10) and the transmitted light. For example, the processor 1420 may distinguish between the image by the light incident from a first fingerprint contact portion (e.g., the first fingerprint contact portion 1301 in FIG. 9) and the image by the light incident from a second fingerprint contact portion (e.g., the second fingerprint contact portion 1521 in FIG. 9) using one image sensor (e.g., the image sensor 930 in FIG. 9).

Figure 13:
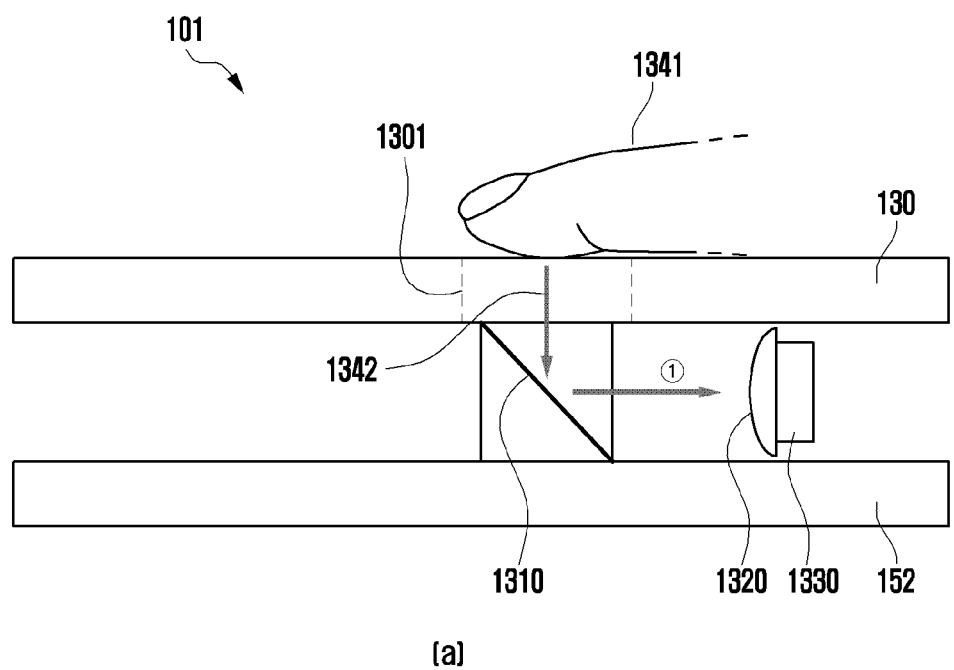
FIG. 13 is a diagram illustrating various shapes of a reflective member according to an embodiment of the disclosure.
Figure 13:
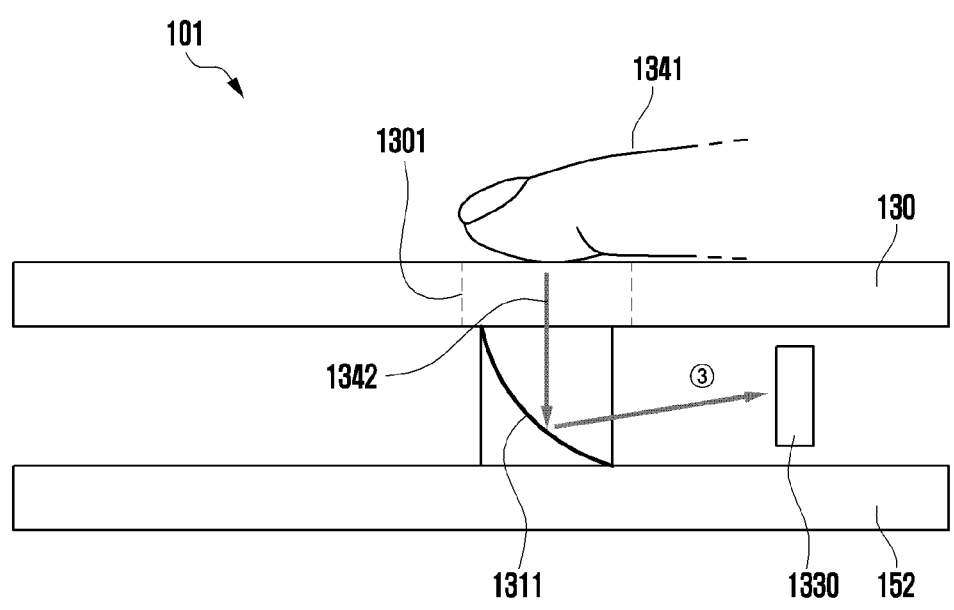

FIG. 13 is a diagram illustrating various shapes of a reflective member and reflection characteristics thereof according to an embodiment of the disclosure.

Referring to part (a) of FIG. 13, a fingerprint recognition module included in the electronic device 101 may include a fingerprint contact portion 1301 (e.g., the first fingerprint contact portion 1301 in FIG. 1), a reflective member 1310, a lens 1320, and an image sensor 1330. Referring to FIG. 13, at least some of the elements of the fingerprint recognition module may be disposed inside a housing (e.g., 110 and 120 in FIG. 1) of the electronic device 101. The housing (e.g., the second housing 120 in FIG. 1) may be disposed in a space between a first display 130 (e.g., the first display 130 in FIG. 1) and a second display 1132 (e.g., the second display 1132 in FIG. 1).

According to various embodiments, the fingerprint contact portion 1301 may be formed in at least a partial area of the first display 130, and transmitted light 1342 may pass through the fingerprint contact portion 1301. According to another embodiment, when a user's finger 1341 comes into contact with the fingerprint contact portion 1301, the transmitted light 1342 corresponding to a user's fingerprint may be transmitted into the housing. The electronic device 101 may obtain a fingerprint image, based on transmitted light information.

According to various embodiments, the reflective member 1310 may reflect the transmitted light 1342 passing through the fingerprint contact portion 1301 in a predetermined direction. According to another embodiment, the reflective member 1310 may be disposed to reflect the transmitted light 1342 in a predetermined direction (e.g., a first direction). For example, the reflective member 1310 may be disposed to reflect the transmitted light 1342 along a path (e.g., a path ①) from the reflective member 1310 to the image sensor 1330. According to yet another embodiment, the reflective member 1310 may include a mirror.

According to various embodiments, the lens 1320 may refract the transmitted light 1342 reflected in a predetermined direction (e.g., the first direction) at a predetermined magnification. According to yet another embodiment, the lens 1320 may have a curvature corresponding to a magnification that makes the transmitted light 1342 have the length of the entire path (e.g., the path ED) formed from the fingerprint contact portion 1301 to the image sensor 1330.

According to various embodiments, the image sensor 1330 may receive the transmitted light 1342 and convert the same into an electrical signal. According to yet another embodiment, the image sensor 1330 may include a plurality of pixels including a light receiving element that converts incident light into an electrical signal. According to yet another embodiment, the image sensor 1330 may be disposed on a printed circuit board included in the housing (e.g., the second housing 120 in FIG. 1), and may include a circuit configured in the form of an application-specific integrated circuit (ASIC). According to yet another embodiment, the image sensor 1330 may be electrically connected to a processor (e.g., the processor 1420 in FIG. 14) and transmit the image generated by receiving the transmitted light 1342 to the processor 1420.

Referring to part (b) of FIG. 13, the reflective member may have a shape corresponding to any one of a flat mirror, a concave mirror, and a convex mirror. For example, the reflective member may have a shape of a concave mirror 1311. According to yet another embodiment, when the reflective member 1311 has a shape of a concave mirror or a convex mirror, the lens 1320 may not be included. For example, the concave mirror 1311 (i.e., reflective member) in the shape of a concave mirror may have a curvature corresponding to a magnification that makes the transmitted light 1342 have the length of the entire path (e.g., a path ③) formed from the fingerprint contact portion 1301 to the image sensor 1330.

Figure 14:
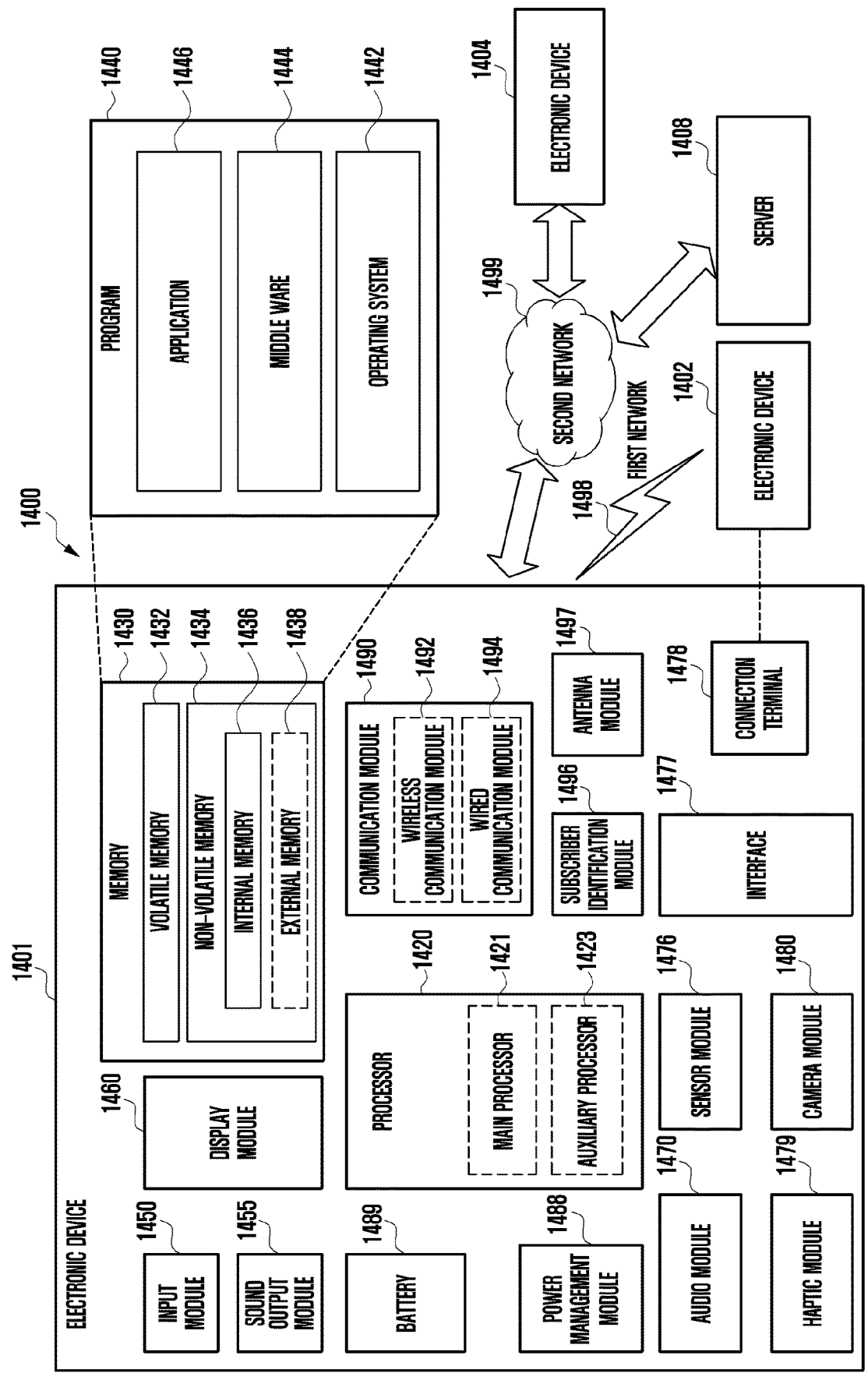
FIG. 14 is a block diagram of an electronic device in a network environment according to an embodiment of the disclosure.

FIG. 14 is a block diagram illustrating an electronic device in a network environment according to an embodiment of the disclosure.

Referring to FIG. 14, an electronic device 1401 in a network environment 1400 may communicate with an electronic device 1402 via a first network 1498 (e.g., a short-range wireless communication network), or at least one of an electronic device 1404 or a server 1408 via a second network 1499 (e.g., a long-range wireless communication network). According to an embodiment, the electronic device 1401 may communicate with the electronic device 1404 via the server 1408. According to another embodiment, the electronic device 1401 may include a processor 1420, memory 1430, an input module 1450, a sound output module 1455, a display module 1460, an audio module 1470, a sensor module 1476, an interface 1477, a connecting terminal 1478, a haptic module 1479, a camera module 1480, a power management module 1488, a battery 1489, a communication module 1490, a subscriber identification module (SIM) 1496, or an antenna module 1497. In some embodiments, at least one of the components (e.g., the connecting terminal 1478) may be omitted from the electronic device 1401, or one or more other components may be added in the electronic device 1401. In some embodiments, some of the components (e.g., the sensor module 1476, the camera module 1480, or the antenna module 1497) may be implemented as a single component (e.g., the display module 1460).

The processor 1420 may execute, for example, software (e.g., a program 1440) to control at least one other component (e.g., a hardware or software component) of the electronic device 1401 coupled with the processor 1420, and may perform various data processing or computation. According to one embodiment, as at least part of the data processing or computation, the processor 1420 may store a command or data received from another component (e.g., the sensor module 1476 or the communication module 1490) in volatile memory 1432, process the command or the data stored in the volatile memory 1432, and store resulting data in non-volatile memory 1434. According to another embodiment, the processor 1420 may include a main processor 1421 (e.g., a central processing unit (CPU) or an application processor (AP)), or an auxiliary processor 1423 (e.g., a graphics processing unit (GPU), a neural processing unit (NPU), an image signal processor (ISP), a sensor hub processor, or a communication processor (CP)) that is operable independently from, or in conjunction with, the main processor 1421. For example, when the electronic device 1401 includes the main processor 1421 and the auxiliary processor 1423, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display module 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to yet another embodiment, the auxiliary processor 1423 (e.g., an image signal processor or a communication processor) may be implemented as part of another component (e.g., the camera module 1480 or the communication module 1490) functionally related to the auxiliary processor 1423. According to yet another embodiment, the auxiliary processor 1423 (e.g., the neural processing unit) may include a hardware structure specified for artificial intelligence model processing. An artificial intelligence model may be generated by machine learning. Such learning may be performed, e.g., by the electronic device 1401 where the artificial intelligence is performed or via a separate server (e.g., the server 1408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input module 1450 may receive a command or data to be used by another component (e.g., the processor 1420) of the electronic device 1401, from the outside (e.g., a user) of the electronic device 1401. The input module 1450 may include, for example, a microphone, a mouse, a keyboard, a key (e.g., a button), or a digital pen (e.g., a stylus pen).

The sound output module 1455 may output sound signals to the outside of the electronic device 1401. The sound output module 1455 may include, for example, a speaker or a receiver. The speaker may be used for general purposes, such as playing multimedia or playing record. The receiver may be used for receiving incoming calls. According to yet another embodiment, the receiver may be implemented as separate from, or as part of the speaker.

The display module 1460 may visually provide information to the outside (e.g., a user) of the electronic device 1401. The display module 1460 may include, for example, a display, a hologram device, or a projector and control circuitry to control a corresponding one of the display, hologram device, and projector. According to yet another embodiment, the display module 1460 may include a touch sensor adapted to detect a touch, or a pressure sensor adapted to measure the intensity of force incurred by the touch.

The audio module 1470 may convert a sound into an electrical signal and vice versa. According to yet another embodiment, the audio module 1470 may obtain the sound via the input module 1450, or output the sound via the sound output module 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to yet another embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to yet another embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to yet another embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to yet another embodiment, the haptic module 1479 may include, for example, a motor, a piezoelectric element, or an electric stimulator.

The camera module 1480 may capture a still image or moving images. According to yet another embodiment, the camera module 1480 may include one or more lenses, image sensors, image signal processors, or flashes.

The power management module 1488 may manage power supplied to the electronic device 1401. According to one embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to another embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The wireless communication module 1492 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1492 may support a high-frequency band (e.g., the mmWave band) to achieve, e.g., a high data transmission rate. The wireless communication module 1492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1492 may support various requirements specified in the electronic device 1401, an external electronic device (e.g., the electronic device 1404), or a network system (e.g., the second network 1499). According to yet another embodiment, the wireless communication module 1492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1497 may transmit or receive a signal or power to or from the outside (e.g., the external electronic device) of the electronic device 1401. According to yet another embodiment, the antenna module 1497 may include an antenna including a radiating element composed of a conductive material or a conductive pattern formed in or on a substrate (e.g., a printed circuit board (PCB)). According to yet another embodiment, the antenna module 1497 may include a plurality of antennas (e.g., array antennas). In such a case, at least one antenna appropriate for a communication scheme used in the communication network, such as the first network 1498 or the second network 1499, may be selected, for example, by the communication module 1490 (e.g., the wireless communication module 1492) from the plurality of antennas. The signal or the power may then be transmitted or received between the communication module 1490 and the external electronic device via the selected at least one antenna. According to yet another embodiment, another component (e.g., a radio frequency integrated circuit (RFIC)) other than the radiating element may be additionally formed as part of the antenna module 1497.

According to various embodiments, the antenna module 1497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to another embodiment, commands or data may be transmitted or received between the electronic device 1401 and the external electronic device 1404 via the server 1408 coupled with the second network 1499. Each of the electronic devices 1402 or 1404 may be a device of a same type as, or a different type, from the electronic device 1401. According to yet another embodiment, all or some of operations to be executed at the electronic device 1401 may be executed at one or more of the external electronic devices 1402 or 1404, or the server 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, mobile edge computing (MEC), or client-server computing technology may be used, for example. The electronic device 1401 may provide ultra low-latency services using, e.g., distributed computing or mobile edge computing. In another embodiment, the external electronic device 1404 may include an internet-of-things (IoT) device. The server 1408 may be an intelligent server using machine learning and/or a neural network. According to yet another embodiment, the external electronic device 1404 or the server 1408 may be included in the second network 1499. The electronic device 1401 may be applied to intelligent services (e.g., smart home, smart city, smart car, or healthcare) based on 5G communication technology or IoT-related technology.

An electronic device according to various embodiments disclosed in this document may include a housing structure that includes a hinge, a first housing connected to the hinge and including a first surface and a second surface directed in the opposite direction of the first surface, and a second housing connected to the hinge and including a third surface and a fourth surface directed in the opposite direction of the third surface, and is configured such that the first surface faces the third surface in a folded state and such that the first surface and the third surface are directed in the same direction in an unfolded state, a first display disposed over the first surface and the third surface, a second display exposed to the outside through at least a portion of the fourth surface, and a fingerprint recognition module including a first fingerprint contact portion formed in at least a portion of the first display corresponding to the third surface and transmitting a first light into the second housing, a second fingerprint contact portion formed in at least a portion of the second display and transmitting a second light into the second housing, a first reflective member configured to reflect the first light, a second reflective member configured to reflect the second light, and an image sensor configured to detect the first light or the second light, wherein the first reflective member is disposed to reflect the first light such that the reflected first light forms a first path from the first reflective member toward the image sensor, and wherein the second reflective member is disposed to reflect the second light such that the reflected second light forms a second path from the second reflective member toward the image sensor.

In addition, the electronic device may further include a processor that is operatively connected to the fingerprint recognition module, wherein the processor may be configured to recognize a fingerprint, based on the first light or the second light detected through the image sensor.

In addition, the first reflective member and the second reflective member may be disposed to be spaced apart from each other inside the second housing.

In addition, the first reflective member and the second reflective member may correspond to different areas on the third surface inside the second housing and may be disposed such that the first path and the second path intersect at the image sensor.

In addition, the first reflective member, the second reflective member, and the image sensor may be sequentially disposed in a line such that at least a portion of the first path overlaps the second path, and the second reflective member may include a dichroic material that transmits a light beam having a wavelength in a first range and reflects a light beam having a wavelength in a second range different from the first range.

The electronic device may further include a processor that is operatively connected to the fingerprint recognition module, wherein the processor may be configured to recognize a fingerprint, based on light having a wavelength in the first range, and calculate an intensity of an external light source, based on light having a wavelength in the second range, among the light received through the image sensor.

In addition, the processor may be configured to produce a fingerprint image corresponding to a fingerprint, based on the light having a wavelength in the first range, and correct the fingerprint image, based on the intensity of the external light source.

In addition, the processor may be configured to recognize a fingerprint, based on the light having a wavelength in the first range, and calculate the intensity of the external light source, based on the light having a wavelength in the second range, when the housing structure is in an unfolded state, and recognize a fingerprint, based on the light having a wavelength in the second range, when the housing structure is in a folded state.

In addition, the image sensor may include a plurality of first elements configured to receive the light having a wavelength in the first range to generate an electrical signal, and a plurality of second elements configured to receive the light having a wavelength in the second range to generate an electrical signal.

In addition, the second reflective member, the first reflective member, and the image sensor may be sequentially disposed in a line such that at least a portion of the second path overlaps the first path, and the first reflective member may include a dichroic material that transmits a light beam having a wavelength in a first range and reflects a light beam having a wavelength in a second range different from the first range.

In addition, at least one of the first reflective member and the second reflective member may be a concave mirror.

In addition, the magnification of the concave mirror may correspond to a distance from the image sensor to the concave mirror.

In addition, the fingerprint recognition module may include one image sensor.

According to various embodiments disclosed in this document, a method for recognizing a fingerprint by an electronic device including an image sensor, a first reflective member configured to reflect a first light to the image sensor, and a second reflective member configured to reflect a second light to the image sensor and including a dichroic material that transmits a light beam having a wavelength in a first range and reflects a light beam having a wavelength in a second range different from the first range may include recognizing a fingerprint, based on the first light detected through the image sensor, recognizing a fingerprint, based on light having a wavelength in the first range, among the second light detected through the image sensor, and calculating an intensity of an external light source, based on light having a wavelength in the second range, among the detected second light.

In addition, the method may further include producing a fingerprint image corresponding to the fingerprint, based on the light having a wavelength in the first range, and correcting the produced fingerprint image, based on the intensity of the external light source.

In addition, the electronic device may further include a housing structure including a first housing and a second housing that are connected to a hinge and form a folded state or an unfolded state, and the method may further include identifying the housing structure and, based on the identified housing structure, recognizing a fingerprint, based on either the light having a wavelength in the first range or the light having a wavelength in the second range.

In addition, the method may further include, if the housing structure is identified to be in an unfolded state, recognizing a fingerprint, based on the light having a wavelength in the first range, and calculating the intensity of the external light source, based on the light having a wavelength in the second range.

In addition, the method may further include recognizing a fingerprint, based on the light having a wavelength in the second range, when the housing structure is in a folded state.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 1440) including one or more instructions that are stored in a storage medium (e.g., the internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semipermanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a hinge;
a first housing connected to the hinge, the first housing comprising a first surface and a second surface directed in an opposite direction of the first surface;
a second housing connected to the hinge, the second housing comprising a third surface and a fourth surface directed in an opposite direction of the third surface, the second housing being configured such that the first surface faces the third surface in a folded state and the first surface and the third surface are directed in a same direction in an unfolded state;
a first display disposed over the first surface and the third surface, wherein the first display includes a first fingerprint contact portion formed at a portion of the first display corresponding to the third surface such that a first light is transmitted through the first fingerprint contact portion into the second housing;
a second display exposed to an outside through at least a portion of the fourth surface, wherein the second display includes a second fingerprint contact portion formed at a portion of the second display such that a second light is transmitted through the second fingerprint contact portion into the second housing;
a first reflective member configured to reflect the first light;
a second reflective member configured to reflect the second light and not overlap with the first reflective member in a direction perpendicular to the first display; and
an image sensor configured to detect the first light and the second light,
wherein the first reflective member is disposed to reflect the first light such that the reflected first light forms a first path from the first reflective member toward the image sensor, and
wherein the second reflective member is disposed to reflect the second light such that the reflected second light forms a second path from the second reflective member toward the image sensor.

2. The electronic device of claim 1, further comprising:
a processor operatively connected to the image sensor,
wherein the processor is configured to recognize a fingerprint based on the first light or the second light detected through the image sensor.

3. The electronic device of claim 1, wherein the first reflective member and the second reflective member are spaced apart from each other inside the second housing.

4. The electronic device of claim 1, wherein the first reflective member and the second reflective member correspond to different areas on the third surface inside the second housing and are disposed such that the first path and the second path intersect at the image sensor.

5. The electronic device of claim 1,
wherein the first reflective member, the second reflective member, and the image sensor are sequentially disposed in a line such that at least a portion of the first path overlaps the second path, and
wherein the second reflective member comprises a dichroic material that transmits a first light beam having a wavelength in a first range and reflects a second light beam having a wavelength in a second range different from the first range.

6. The electronic device of claim 5, further comprising:
a processor operatively connected to the image sensor,
wherein the processor is configured to:
recognize a fingerprint based on light having the wavelength in the first range, and
calculate an intensity of an external light source, based on light having the wavelength in the second range, among light detected through the image sensor.

7. The electronic device of claim 6, wherein the processor is further configured to:
produce a fingerprint image corresponding to the fingerprint based on the light having the wavelength in the first range, and
correct the fingerprint image based on the intensity of the external light source.

8. The electronic device of claim 6, wherein the processor is further configured to:
recognize the fingerprint based on the light having the wavelength in the first range,
while the electronic device is in an unfolded state, calculate the intensity of the external light source based on the light having the wavelength in the second range, and
while the electronic device is in a folded state, recognize the fingerprint based on the light having the wavelength in the second range.

9. The electronic device of claim 5, wherein the image sensor comprises:

a plurality of first elements configured to receive light having the wavelength in the first range to generate a first electrical signal, and a plurality of second elements configured to receive light having the wavelength in the second range to generate a second electrical signal.

10. The electronic device of claim 1,
wherein the second reflective member, the first reflective member, and the image sensor are sequentially disposed in a line such that at least a portion of the second path overlaps the first path, and
wherein the first reflective member comprises a dichroic material that transmits a first light beam having a wavelength in a first range and reflects a second light beam having a wavelength in a second range different from the first range.

11. The electronic device of claim 1, wherein at least one of the first reflective member or the second reflective member is a concave mirror.

12. The electronic device of claim 11, wherein a magnification of the concave mirror corresponds to a distance from the image sensor to the concave mirror.

13. The electronic device of claim 1,
wherein the first reflective member is disposed at a position corresponding to a first fingerprint contact portion, and
wherein the second reflective member is disposed at a position corresponding to a second fingerprint contact portion.

14. A method for recognizing a fingerprint by an electronic device comprising:
an image sensor;
a first reflective member configured to reflect a first light to the image sensor; and
a second reflective member configured to reflect a second light to the image sensor, the second reflective member comprising a dichroic material that transmits a first light beam having a wavelength in a first range and reflects a second light beam having a wavelength in a second range different from the first range,
wherein the method comprises:
recognizing a fingerprint based on the first light detected through the image sensor;
recognizing the fingerprint, based on light having the wavelength in the first range, among the second light detected through the image sensor; and
calculating an intensity of an external light source, based on light having the wavelength in the second range, among the second light detected through the image sensor.

15. The method of claim 14, further comprising:
producing a fingerprint image corresponding to the fingerprint based on the light having the wavelength in the first range; and
correcting the produced fingerprint image based on the intensity of the external light source.

16. The method of claim 14,
wherein the electronic device further comprises a housing structure comprising a first housing and a second housing that are connected to a hinge and form a folded state or an unfolded state, and
wherein the method further comprises:
identifying the housing structure, and
based on the identified housing structure, recognizing the fingerprint using either the light having the wavelength in the first range or the light having the wavelength in the second range.

17. The method of claim 16, further comprising:
while the housing structure is identified to be in an unfolded state, recognizing the fingerprint based on the light having the wavelength in the first range; and
calculating the intensity of the external light source based on the light having the wavelength in the second range.

18. The method of claim 16, further comprising:
while the housing structure is identified as being in a folded state, recognizing the fingerprint based on the light having the wavelength in the second range.

* * * * *